United States Patent
Fyfe et al.

(10) Patent No.: US 11,319,794 B2
(45) Date of Patent: May 3, 2022

(54) OIL-WELL PUMP INSTRUMENTATION DEVICE AND METHOD

(71) Applicant: 4IIII INNOVATIONS INC., Cochrane (CA)

(72) Inventors: Kelly Fyfe, Cochrane (CA); Kipling William Fyfe, Cochrane (CA); Thomas Richard Williams, Edmonton (CA)

(73) Assignee: 4IIII INNOVATIONS INC., Cochrane (CA)

(*) Notice: Subject to any disclaimer, the term of this patent is extended or adjusted under 35 U.S.C. 154(b) by 0 days.

(21) Appl. No.: 16/646,928

(22) PCT Filed: Sep. 12, 2018

(86) PCT No.: PCT/IB2018/001161
§ 371 (c)(1),
(2) Date: Mar. 12, 2020

(87) PCT Pub. No.: WO2019/053513
PCT Pub. Date: Mar. 21, 2019

(65) Prior Publication Data
US 2020/0263531 A1  Aug. 20, 2020

Related U.S. Application Data

(63) Continuation-in-part of application No. PCT/IB2018/052969, filed on Apr. 30, 2018.
(Continued)

(51) Int. Cl.
*E21B 47/009* (2012.01)
*E21B 43/12* (2006.01)
(Continued)

(52) U.S. Cl.
CPC .......... *E21B 47/009* (2020.05); *E21B 43/127* (2013.01); *F04B 47/026* (2013.01);
(Continued)

(58) Field of Classification Search
CPC ... E21B 43/127; E21B 47/009; G01L 5/0061; G01C 9/06; G01C 9/08; G01B 7/16;
(Continued)

(56) References Cited

U.S. PATENT DOCUMENTS 4,145,161 A * 3/1979 Skinner ................ E21B 43/127
417/22
4,507,055 A * 3/1985 Fair ...................... E21B 47/009
417/12

(Continued)

FOREIGN PATENT DOCUMENTS

| CN | 102435366 B | 8/2014 |
| CN | 106767617 A | 5/2017 |

OTHER PUBLICATIONS

PCT/CN2017/085210 International Search Report and Written Opinion dated Feb. 5, 2019, 10 pp.
(Continued)

*Primary Examiner* — Charles G Freay
(74) *Attorney, Agent, or Firm* — Lathrop GPM LLP

(57) ABSTRACT

A pumpjack monitor includes a processor and memory, a communicator for communicating with other monitors and a server, a sensor module having at least one strain gauge, and accelerometers for determining vibration and position of the monitor. Other sensors may be internal, including sensors for polished-rod rotation, and linked to the monitoring device wirelessly. Some embodiments serve as network hubs or bridges for other monitors. The server is configured to generate surface cards. A method for monitoring of pumpjacks uses the monitor to sense changes in pumpjack parameters, and communicate the changes to a server when changes exceed configurable thresholds. Some embodiments include determining location with GPS and/or relaying signals from other monitoring devices, smart power management, gas sensing, and relaying of signals from (Continued)

external wireless-equipped sensors such as valve position sensors, oil level sensors, and pressure sensors.

17 Claims, 15 Drawing Sheets

Related U.S. Application Data

(60) Provisional application No. 62/557,627, filed on Sep. 12, 2017, provisional application No. 62/675,137, filed on May 22, 2018, provisional application No. 62/492,565, filed on May 1, 2017.

(51) Int. Cl.
| | |
|---|---|
| *F04B 51/00* | (2006.01) |
| *F04B 47/02* | (2006.01) |
| *G01L 5/00* | (2006.01) |
| *G01C 9/06* | (2006.01) |
| *G01B 7/16* | (2006.01) |
| *H04Q 9/00* | (2006.01) |
| *G01C 9/08* | (2006.01) |

(52) U.S. Cl.
CPC ............... *F04B 51/00* (2013.01); *G01B 7/16* (2013.01); *G01C 9/06* (2013.01); *G01C 9/08* (2013.01); *G01L 5/0061* (2013.01); *H04Q 9/00* (2013.01); *F04B 47/022* (2013.01); *F04B 47/028* (2013.01); *H04Q 2209/40* (2013.01)

(58) Field of Classification Search
CPC .... H04Q 9/00; H04Q 2209/40; F04B 47/026; F04B 47/022; F04B 47/028; F04B 49/065; F04B 2201/121
See application file for complete search history.

(56) References Cited

U.S. PATENT DOCUMENTS

| | | | |
|---|---|---|---|
| 5,291,777 A * | 3/1994 | Chang | E21B 43/127 73/152.62 |
| 5,464,058 A | 11/1995 | McCoy et al. | |
| 6,409,476 B2 * | 6/2002 | Mills | E21B 47/007 417/18 |
| 9,080,438 B1 * | 7/2015 | McCoy | E21B 47/009 |
| 9,896,927 B2 | 2/2018 | McCoy | |
| 2020/0123892 A1 * | 4/2020 | Picon | E21B 43/127 |
| 2020/0232312 A1 * | 7/2020 | Pons | E21B 47/009 |
| 2021/0081823 A1 * | 3/2021 | Boguslawski | G06N 20/00 |

OTHER PUBLICATIONS

Waggoner et al. (1997) "Development of the downhole dynamometer database." InSPE Production Operations Symposium Jan. 1, 1997. Society of Petroleum Engineers, 7 pp.

* cited by examiner

OIL-WELL PUMP INSTRUMENTATION DEVICE AND METHOD

CROSS-REFERENCE TO RELATED APPLICATIONS

The present application is a 35 U.S.C. § 371 filing of International Application number PCT/IB2018/001161, filed 12 Sep. 2018, which claims priority to U.S. Provisional Patent Application No. 62/557,627, filed 12 Sep. 2017, and U.S. Provisional Patent Application No. 62/675,137, filed 22 May 2018. International Application number PCT/IB2018/001161 is also a continuation-in-part of International Application number PCT/IB18/52969, filed 30 Apr. 2018, which claims priority to U.S. Provisional Patent Application No. 62/492,565, filed 1 May 2017. The entire contents of the aforementioned applications are incorporated herein by reference.

FIELD

The present document relates to the field of instrumentation that may be applied to pumpjacks, such as those often used on oil wells, and to the use of such instrumentation to analyze performance of the well, the well pump, and the pumpjack. In embodiments, in addition to recording data for other analysis, an enhanced "surface card" is generated showing sucker-rod load plotted against displacement, along with sucker-rod rotation and torque.

BACKGROUND

Many oil wells lack sufficient down-hole pressure to force adequate oil to the surface. These oil wells profit from having oil mechanically pumped.

Many components of pumpjacks are under considerable stress, move frequently, and are subject to significant wear. For example, the saddle bearing bears weight of the walking beam, sucker rod, polished rod, and counterweights, plus forces due to weight of oil in the tubing, rotates as the walking beam reciprocates, and thus can wear. Other components may also wear, including the motor, gearbox, polished rod, stuffing box, wrist pin, the pump piston and cylinder, and—particularly if sand gets into oil of the well—valves and checkvalves of the pump and tubing. Further, oil levels in the well may change over time and as oil is pumped, altering stresses on all these components.

SUMMARY

We have found that electronically monitoring stresses and vibrations of pumpjack components, including stress on the polished rod, can give early warning of pumpjack and pump failure, permitting maintenance and repair before these components break. Monitoring results may be presented in "augmented surface card" form, including a plot of polished-rod axial load versus displacement, augmented with polished-rod rotation and torque. Monitoring and early repair may also reduce production loss due to pumpjack downtime, and energy waste from pumping despite low oil levels in the well.

A pumpjack monitor includes a processor and memory, a communicator for communicating with other monitoring devices and a server, a sensor module having at least a strain gauge and accelerometers for determining vibration and position of the monitor, the server having code to generate surface cards. Other sensors may be provided either externally or internally, including sensors for polished-rod rotation, and linked to the monitoring device by digital wireless communications. Some embodiments may serve as network hubs or bridges for other monitoring devices. A method for monitoring of pumpjacks uses the monitor attached to pumpjacks to sense changes in pumpjack parameters, and communicating the changes to a server when the changes exceed configurable thresholds. Some embodiments include determining location with GPS and/or relaying signals from other monitoring devices, smart power management, gas sensing, and relaying of signals from external wireless-equipped sensors such as valve position sensors, oil level sensors, and pressure sensors.

In an embodiment, a polished-rod dynamometer has at least one accelerometer adapted to measure acceleration and vibration of the polished rod, a strain gauge adapted to measure axial load on the polished rod, and a processor adapted by firmware to double-integrate polished-rod acceleration to determine polished-rod position in a pumpjack cycle and to record vibration and tension change on the polished rod relative to polished-rod position.

An intelligent equipment monitor includes a processor and memory, a communicator for communicating with other monitoring devices and a server, and a sensor module having at least a strain gauge and an accelerometer. In a particular embodiment, the strain gauge is adapted to measure axial load on a polished rod of a pumpjack, and the accelerometer or an inclinometer is adapted to indicate displacement of the operating rod. Other sensors may be provided, including gas monitoring sensors and temperature sensors linked to the monitoring device by short-range digital radio. Some embodiments may serve as network hubs or bridges for other monitoring devices. Some embodiments are integrated with an oil-well pumpjack.

A particular embodiment is a polished-rod dynamometer configured for attachment to a polished rod of a pumpjack, and includes accelerometers adapted to measure acceleration and vibration of the polished rod as well as a strain gauge adapted to measure forces on the polished rod. The polished-rod dynamometer double-integrates polished-rod acceleration to determine polished-rod position, and records vibration and tension changes on the polished rod relative to the polished-rod position. In particular embodiments, the polished-rod dynamometer is adapted to monitor rotation of the polished rod, and includes gas sensors to verify correct sealing of a stuffing box. In a particular embodiment, monitoring results may be presented in "enhanced augmented surface card" form, including a plot of polished-rod axial load versus displacement, with polished-rod rotation and torque.

A method for monitoring of pumpjacks and appurtenances uses the monitoring device attached to a pumpjack to sense changes in parameters of the pumpjack and communicate data from the monitoring device to a server. This may include setting an alarm when data differs from previously recorded data from the same pumpjack by more than a configurable threshold. Some embodiments include determining location with GPS and/or smart power management, gas sensing, and relaying of signals from other monitoring devices and wireless-equipped sensors such as valve position, oil level, and pressure sensors. Some embodiments present monitoring results in "augmented surface card" form, including a plot of polished-rod tension and/or compression versus displacement, along with polished-rod rotation and torque.

DETAILED DESCRIPTION OF THE EMBODIMENTS

Pumpjacks

Figure 1:
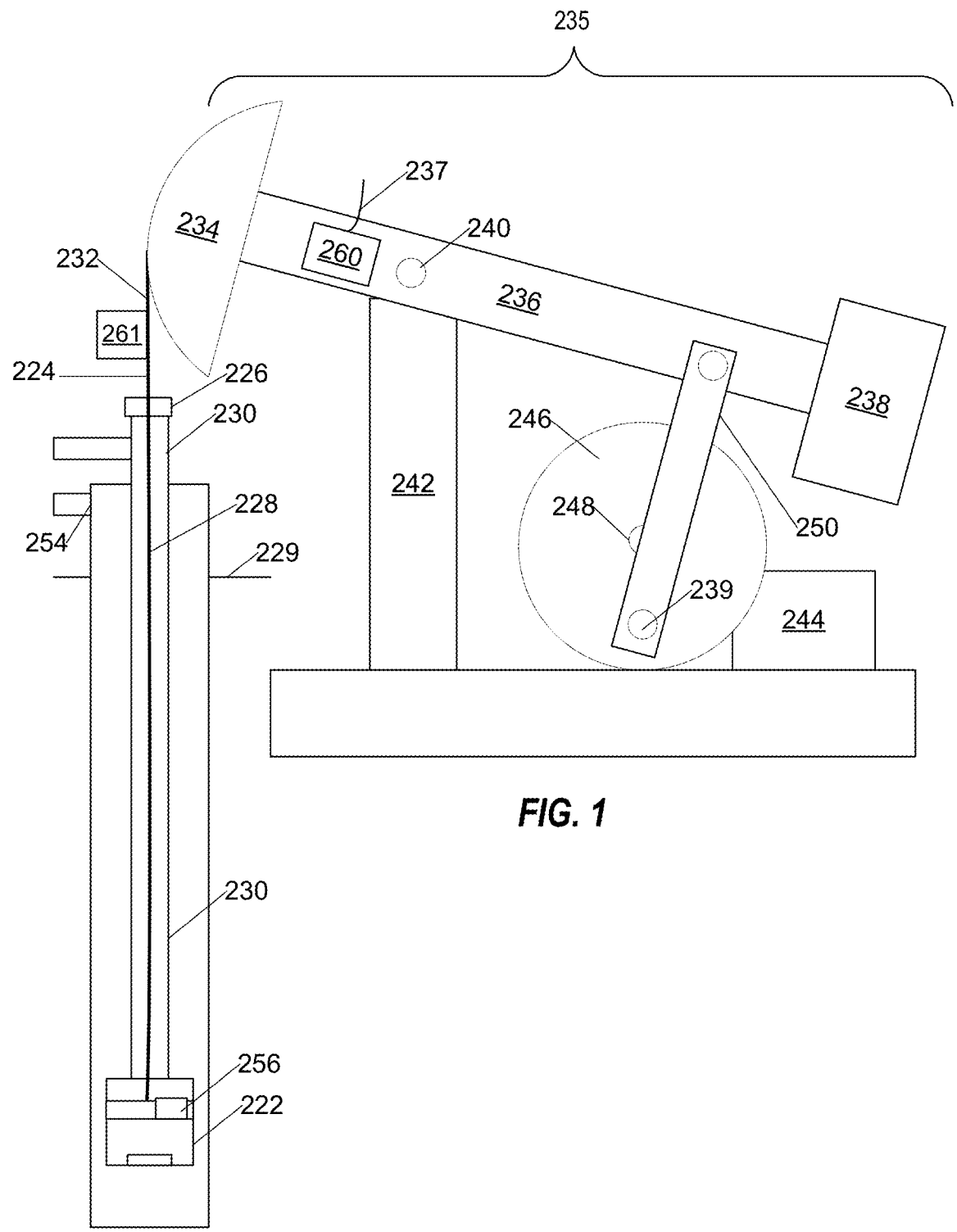
FIG. 1 is a schematic block diagram of a pumpjack and oil wellhead, showing placement of monitoring devices.

Many oilfield pumps are submersible mechanical pumps 222 (see FIGS. 1 and 2) actuated by a metal rod known as a "polished rod" 224 that penetrates through a stuffing box 226, coupling to a steel or fiberglass "sucker rod" 228 (in some cases a cable substitutes for part or all of the sucker rod) that may extend 2000 feet, 5000 feet, or more, below ground level 229, through a tubing 230 to the submerged pump 222. Pump 222 is typically a piston-type pump actuated by reciprocating movements of the sucker rod 228. Various types of pumpjacks exist. Some, as in FIG. 1, have counterweights 238 that attach directly to the walking beam 236. In others, as in FIG. 2, counterweights may attach close to the gearbox and motor. In both types, counterweights are selected and positioned to reduce load on the gearbox and motor from weight of the sucker rod 228 and oil in the tubing 230. At the wellhead end, the polished rod 224 typically couples through a cable or bridle 232 to a curved head or horsehead 234 attached to a pumpjack's 235 walking beam 236. Horsehead 234 is attached to a crank 239 and, in some pumpjacks, rotating counterweight 238 by walking beam 236, equalizer bearing 249, wrist pin 245, and pitman arm 251. Walking beam 236 is hinged by a saddle bearing, or pivot 240, to a Samson post or support 242. A prime mover or motor 244, usually an electric motor, drives a disk 246 or crank 239 through a gearbox 243 and axle 248. The disk 246 is coupled through a pivoted link 250 such as wrist pin 245 and pitman arm 251 to walking beam 236 to rock the walking beam 236 and thus drive polished rod 224 and sucker rod 228 in a vertical reciprocating motion to drive pump 222. The wellhead has valves and fittings (most are not shown), including an outlet from tubing 230 through which pumped oil leaves the well on its way to a gas-oil separator, and a gas outlet 254 through which gas collected in the well casing exits the well.

Issues with Wellheads and Pumpjacks

Many parts of oil wellheads and pumpjacks can fail, of which we will mention only a few. The stuffing box 226 can leak oil or natural gas due to insufficient tightening of seals in stuffing box 226, polished-rod wear, excessive pressure in the well, lose or wobbly rod guides, or other factors. Saddle bearing or pivot 240 supporting walking beam 236 can chatter and fail, particularly if not well lubricated, as can bearings at ends of pivoted link 250 or pitman arm 251 and axle 248. If the pumpjack is not properly aligned with the wellhead, bending of the polished rod may break the polished rod. Sucker rods or cables may wear against the interior of tubing 230, eventually causing leaks from tubing into the well causing either separation or breaking of the sucker rod. Typically, motor 244 is operated for a time to pump out oil that has accumulated in the well casing, and, when oil falls below a minimum level above pump 222, the motor shuts down until more oil accumulates. Level switches and timers can fail or be set incorrectly as oil flow changes with well age, causing pumpjack operation without the presence of oil to pump. Motor 244 typically operates the walking beam 236 through a gearbox and crank, gearboxes can leak lubricant and gears may wear unevenly or may suffer tooth breakage, producing vibrations or even a cessation of horsehead movement. Valves 256 of pump 222 can fail, or checkvalves installed in tubing 230 may fail, allowing oil to leak from tubing 230 into the well casing and result in inefficient or failed pumping. Walking beam 236 is under considerable stress and can bend or fail. Since the mass of proper counterweight 238 depends on the height of oil in tubing 230 above the level in the well, improper counterweights may have been provided such that the motor and gearbox overload, breaking components or jamming the system. The polished rod 224 or the bridle 232, clamp 227 (see FIG. 4), and carrier bar 223 (see FIG. 4) connecting the polished rod 224 to the horsehead 234 may chafe or break, or a joint between sections (not shown) of the sucker rod 228 may separate. In some oil wells that produce oil with high paraffin content, tubing may clog with waxy deposits of paraffin, requiring cleanout or addition of rotatable paraffin scrapers driven by, and attached to, the sucker rod 228. In many systems the paraffin scrapers are attached to and rotate with a rotatable sucker rod. Rotation of paraffin scrapers may fail, allowing the tubing to clog. When any of these events occur, it is desirable to detect the problem, identify the fault, notify service personnel so repairs can be made, and provide service personnel with a pump card to illustrate issues with the well.

Monitoring Device

In order to improve monitoring and diagnosis of oil wells and associated pumpjacks 235 and appurtenances, in some embodiments we attach a monitoring device 260 to the pivoting walking beam 236 of each pumpjack. In an embodiment (see FIG. 3), monitoring device 260 has sensors including a strain sensor configured for attachment to and measurement of load in walking beam 236, and other sensors 291 including one or more of temperature sensors, light sensors, vibration sensors or accelerometers, and methane gas leak-detector sensors. In embodiments mounted to a walking beam of a pumpjack, an accelerometer provides measurement of walking beam angle and allows firmware to determine of where in the pumpjack's cycle vibrations or excessive loads occur.

Figure 2:
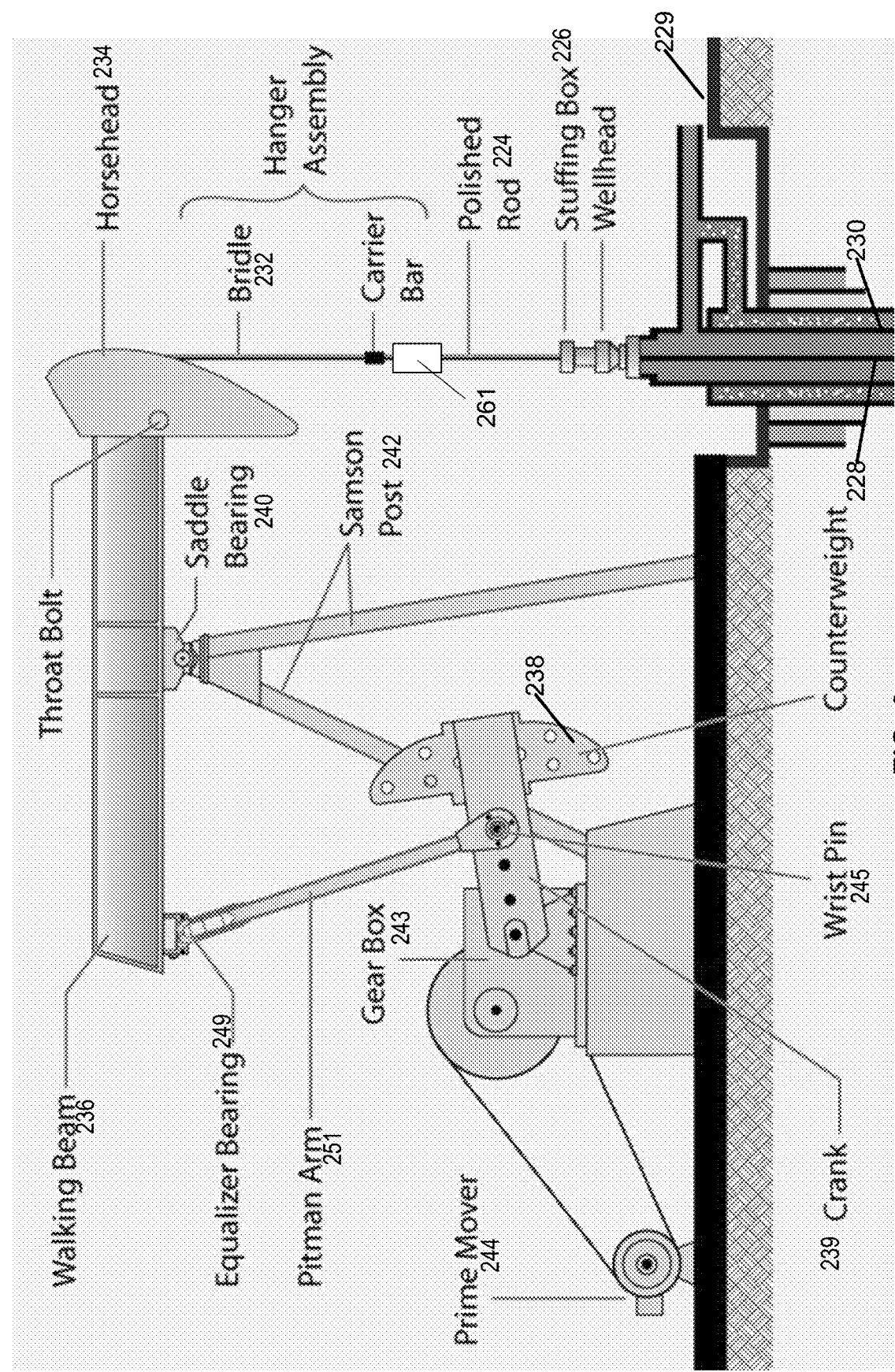
FIG. 2 is a schematic block diagram of another type of pumpjack, showing polished rod and walking beam.
Figure 4:
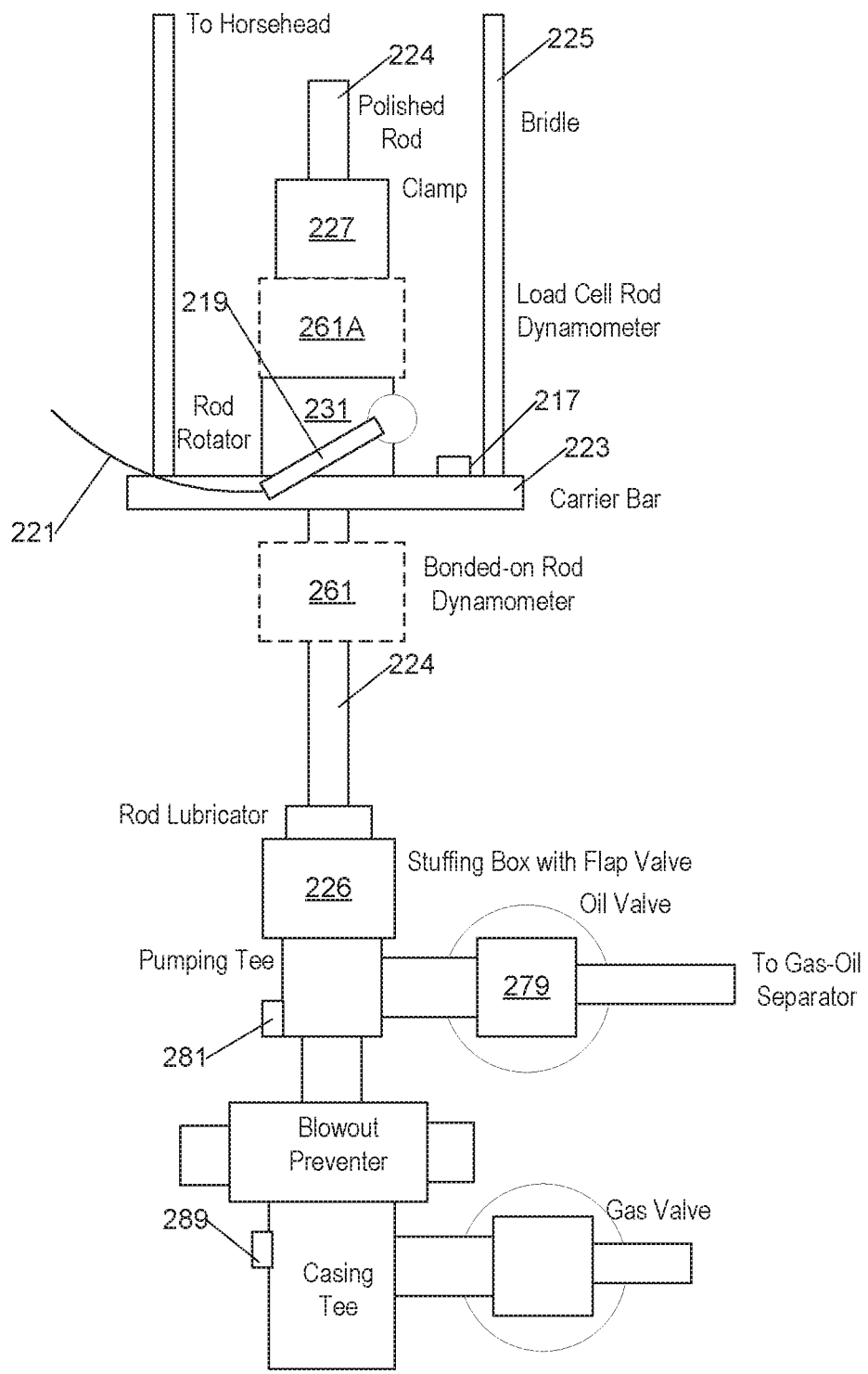
FIG. 4 illustrates the polished rod of a rod-pumped wellhead with associated devices and a polished-rod monitoring device.
Figure 8:
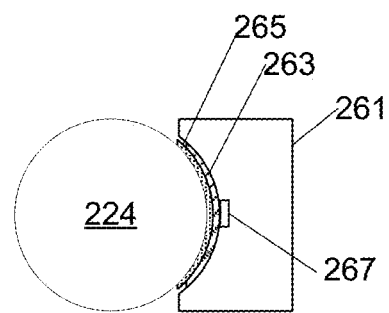
FIG. 8 is a cross section illustrating an embodiment having a surface conformal to, and bonded to, a polished rod.

In an alternative embodiment, a polished-rod dynamometer 261 is attached to the polished rod 224 associated with each pumpjack (see FIGS. 1 and 8). In a particular embodiment, polished-rod dynamometer 261 has a side including a soft metal or polyimide plate 263 configured to conform to, and be glue 265 bonded to, polished rod 224 as illustrated in FIG. 8. In glue-bonded embodiments, torque applied by rod rotators is sensed with pairs of oppositely-oriented diagonal strain gauges. In an alternative embodiment, a polyimide plate is substituted for soft metal plate 263. In an embodiment with polished-rod dynamometer 261 attached to polished rod 224, polished-rod dynamometer 261 includes a constant-current strain-gauge sensor 267 bonded onto the soft metal plate 263 and configured for measurement of axial load in polished rod 224, and other sensors 291 may include one or more of temperature sensors, light sensors, vibration sensors or accelerometers, and methane gas leak sensors. In this embodiment, soft metal plate 263 is, in turn, bonded to the polished rod and may be attached below the carrier bar of wellhead pumping apparatus. In an alternative embodiment (see polished-rod dynamometer 261A in FIG. 4), a load cell is used to determine axial load on polished rod 224 by measuring compressive forces, instead of strain gauges attached through soft metal plate 263, embodiments with the load cell are typically attached between a rod rotator and polished-rod clamp, the rod rotator resting atop the carrier bar. The embodiment may include a strain-gauge or load-cell based torque sensor (not shown) that measures torque applied between a rod rotator 231 and polished rod 224 with attached clamp 227. Approximate locations of polished-rod dynamometers 261 and 261A are illustrated in FIG. 4 with dashed lines since only one of polished-rod dynamometers 261 and 261A is present in a system.

Sensor 291 may be configured to monitor displacement of the polished rod 224. In various embodiments, sensors configured to monitor displacement include an inclinometer or accelerometer, the inclinometer or accelerometer compensated for motion effects of the walking beam, attached to the walking beam of the pumpjack and linked to a polished-rod dynamometer 261 by short range radio, or an accelerometer within the polished-rod dynamometer 261. In embodiments having an accelerometer within the polished-rod dynamometer 261, the accelerometer may be a current-excited accelerometer previously calibrated or trained against a separate high-precision accelerometer that may or may not remain present in the polished-rod dynamometer 261. When an accelerometer-based inclinometer is used to detect an angle of the walking beam, at high walking beam movement rates measurement errors occur when the accelerometer is not at the pivot point of the walking beam. These errors are corrected in our wireless inclinometer by a processor and memory executing correction firmware in the inclinometer and using either two accelerometers spaced at a known distance apart and positioned at a known distance from the saddle bearing of the walking beam or an accelerometer and gyroscope to measure angular velocity and angular acceleration with differentiation performed within the inclinometer to compensate for "motion accelerations" at the inclinometer location. If gyroscopes are used for this error correction, we use the periodic nature of walking beam motion to estimate and compensate for this bias in real time. This compensation makes use of the mean of the signal over one period being equal to the bias. The inclinometer also includes a digital radio and real-time clock adapted for wireless transmission of timestamped walking beam angles to the polished-rod dynamometer.

In alternative embodiments, other displacement sensors such as a laser rangefinder may be used. In other embodiments of polished-rod dynamometer 261 that may attach to the polished rod 224, a photodiode or phototransistor of the monitoring device paired with an LED attached to a frame of the pumpjack, a magnetic sensor in the monitoring device with a reference magnet attached to the frame of the pumpjack or to frame attached to the wellhead, or an ultrasonic rangefinder, provides reference "ticks" in each pumpjack cycle; combined with a timer in polished-rod dynamometer 261 this permits firmware to approximate pumpjack angle and polished-rod position. In another embodiment of polished-rod dynamometer 261, a laser or ultrasonic rangefinder provides direct measurements of minimum and maximum points, and a present position in, the pumpjack cycle; in this embodiment the measured position of the pumpjack cycle is reported with measured axial load and any observed vibration.

Figure 5:
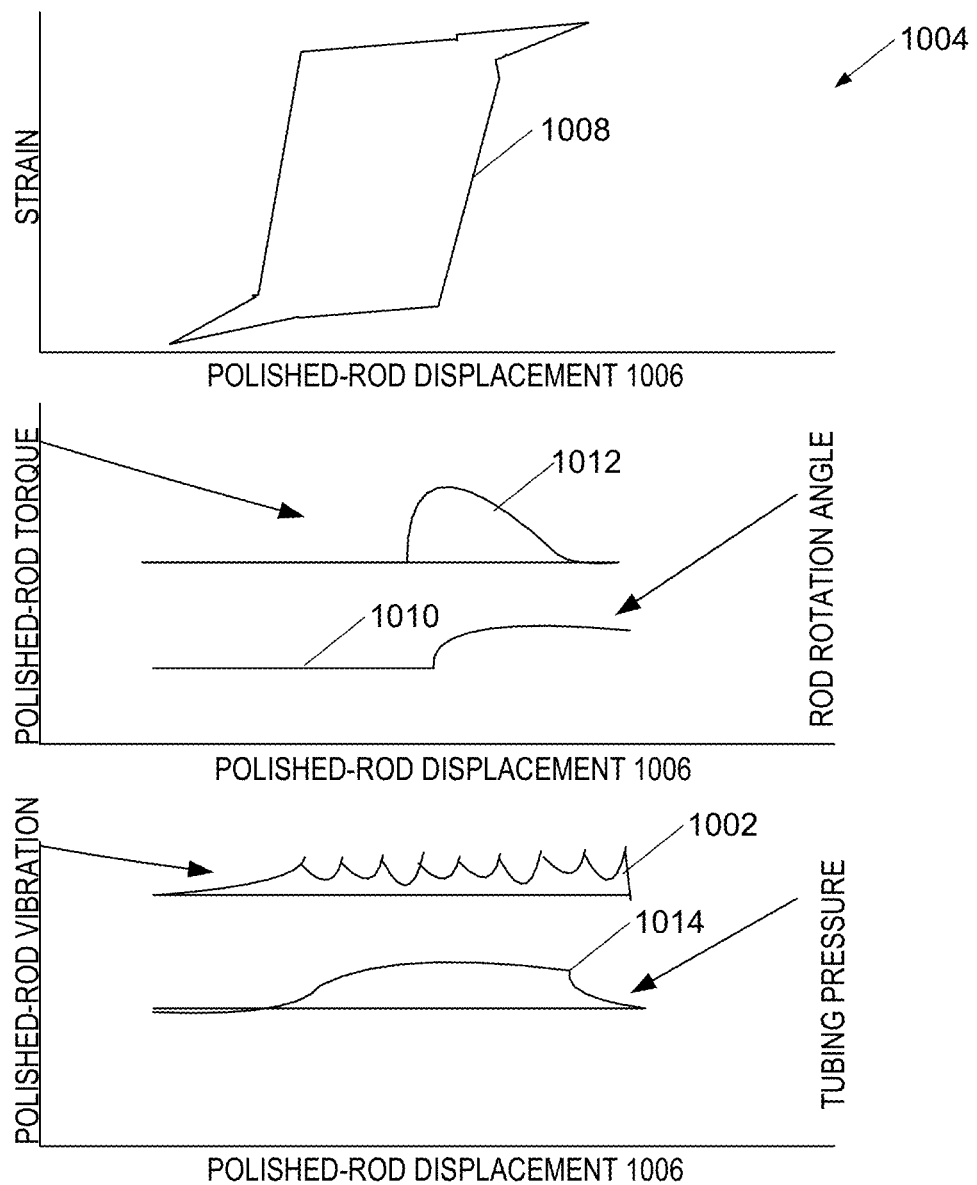
FIG. 5 illustrates plots on an enhanced surface card generated with the polished-rod dynamometer of FIG. 4.
Figure 9:
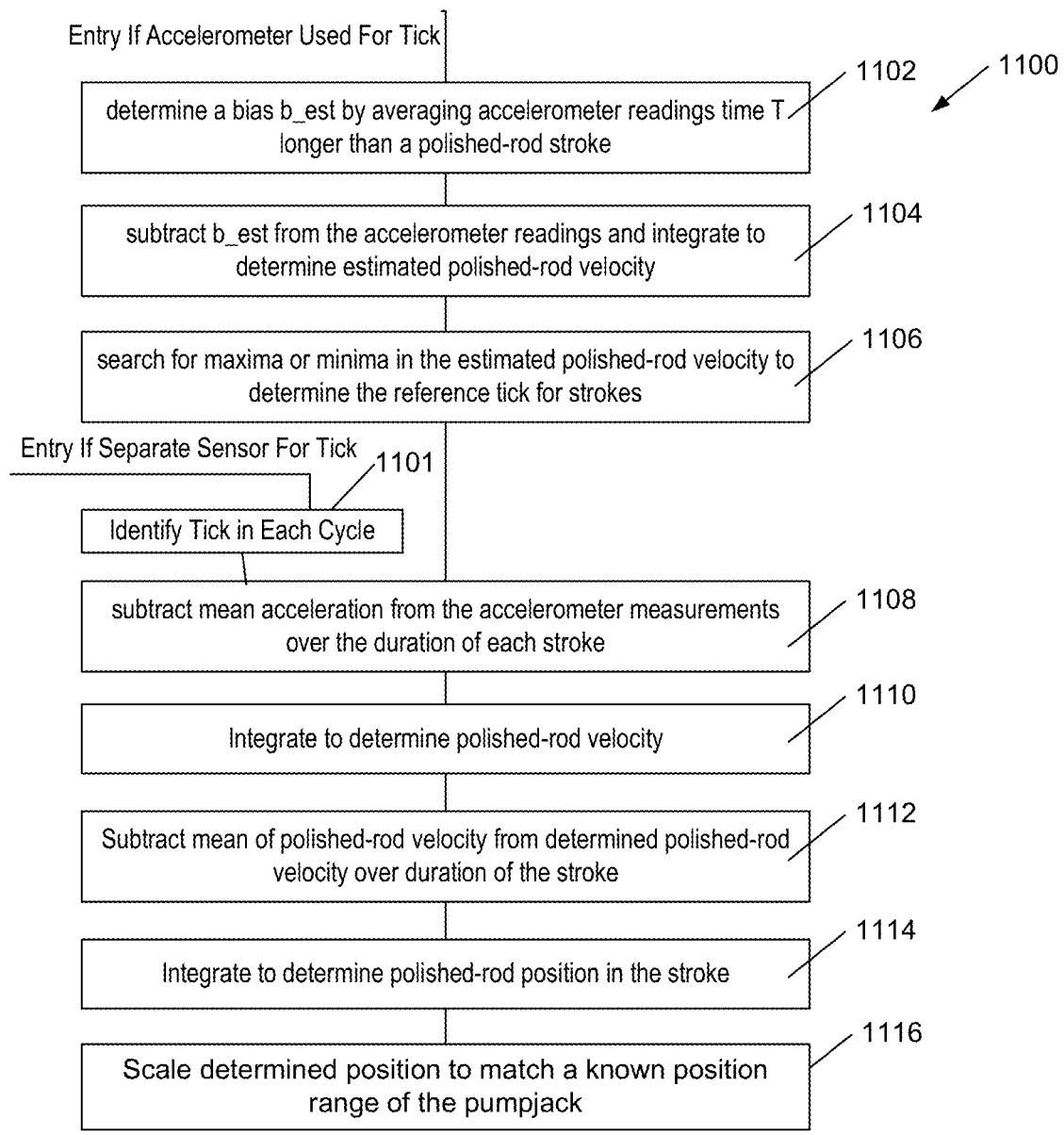
FIG. 9 is a flowchart illustrating processing of accelerometer data in a polished-rod dynamometer to determine polished-rod position in a pumpjack cycle.

In embodiments having an accelerometer within polished-rod dynamometer 261, accelerometer readings are low-pass filtered and double-integrated with double offset correction to provide displacement of the polished rod according to method 1100 (FIG. 9), the low-pass filtering and double integration performed through firmware executing on a processor of polished-rod dynamometer 261. This determination of displacement from accelerometer readings allows firmware to determine where in the pumpjack's cycle vibrations detected by the accelerometer, or measured loads on the polished rod, occur so high-resolution signatures of magnitudes 1002 or frequencies of these vibrations and loads can be logged and reported with associated pumpjack cycle position, or plotted against polished-rod displacement 1006 on a surface card 1004, as illustrated in FIG. 5. These high-resolution signatures and positions may give information regarding downhole conditions and problems.

An accelerometer in a polished-rod dynamometer 261 mounted on the polished rod measures a contaminated version of the acceleration, accelerometer readings are affected by noise and bias errors, even after the effects of gravity have been compensated for as best as possible. Inevitably imperfect alignment means that only a component of the acceleration of interest is measured, the effect being much like a scale factor. Simple double integration of the imperfect signal to get to velocity and again to yield position leads to a position estimate with potential scale, noise and bias errors; bias leads to a quadratic divergence with time and random noise yields a random ramp. Scale factor or alignment errors may lead to a position estimate with incorrect peak-to-peak range.

To improve position determined by double integration from accelerometer readings taken within the polished-rod dynamometer 261, we identify 1101 (FIG. 9) the same instant, or tick, of each stroke, such as with an external magnet and magnetometer, or recognize another repeating signal from the pumpjack combined with known pumpjack kinematics. We use this tick knowing the polished-rod velocity should be the same at the beginning and end of each identified stroke, and the polished-rod position should be the same at the beginning and end of the identified strokes. We also know, based upon the pumpjack design, the "range" of position from the maximum position minus the minimum position over the duration of the stroke.

Using this information, we can determine, in firmware executing on processor 302, a reasonable position estimate over each stroke from the accelerometer on the polished rod by determining when a stroke occurs (stroke identification), subtracting 1108 mean acceleration from the accelerometer measurements over the duration of the identified stroke, integrating 1110 estimated velocity, subtracting 1112 a mean velocity from the estimated velocity over the stroke duration, integrating 1114 again to estimate polished-rod position throughout the stroke, and applying a scaling 1116 transformation to the estimated position so that the range matches the known position range.

Stroke determination or reference tick may also be accomplished through external sensors such as a proximity sensor on the walking beam or counterweights, or many other kinds of sensor including an internal magnetic sensor. Alternatively, an internal accelerometer signal may be filtered according to known pumpjack kinematics and used to provide a reference tick. When using accelerometer signals, noise and low signal levels of the accelerometer can complicate this process. One method of using accelerometer output to determine a reference tick begins by estimation 1102 of the accelerometer bias b_est by averaging the accelerometer output over a time period significantly longer than the duration of the slowest stroke. Estimation of b_est should continue over time, because it may change due to temperature or other effects. Once b_est is estimated, it should be subtracted 1104 from the incoming accelerometer signal before integrating to get a rough estimate of velocity. A robust search 1106 for maxima and/or minima in this velocity is then be used to detect strokes, a reference tick may be at a maximum or a minimum of velocity. This approach is preferable to working with the accelerometer signal alone because integration reduces noise, while approximate mean removal prevents the velocity estimate from diverging so that local minima and maxima are detectable. In an alternative embodiment, both minima and maxima are identified within each stroke so that the stroke is separated into two pieces, such as time from minima to maxima and from maxima to minima. Scaling is then applied to each half of the stroke independently.

In embodiments, this estimation of polished-rod position from accelerometer readings is performed by firmware executing on processor 302 (FIG. 10) within polished-rod dynamometer 261.

In some embodiments, position of the polished rod is observed by a sensor pod containing one or more of an optical gray-code angular position encoder, a 36-1 tooth wheel with optical or variable-reluctance sensors like those used for crankshaft position sensors, or another angular position or rotation sensor known in the art of sensing rotation or angular position. 36-1 tooth sensors typically operate by rotating a gear-like wheel having 36 or 72 teeth with one tooth missing, detecting tooth passage as tooth ticks with a magnetic sensor, timing tooth to tooth ticks, and then, when a tooth tick comes after about 1.5 times normal tooth tick spacing, the following tick becomes a cycle reference mark. 36-1 tooth wheels sensors can update shaft rotation speeds on each tooth tick so they can update rotation speed every 10 degrees (or 5 degrees if a 72-1 wheel). The sensor pod is coupled to monitor rotation of the crank of the pumpjack or monitor rotation of an output shaft of the gearbox of the pumpjack. Readings of these sensors are transmitted from this sensor pod to monitoring device 260 or pumpjack dynamometer 261 by short range wireless, whereupon it may be transferred to the server with same-time axial load observation data. In particular embodiments, polished-rod positions estimated by double-integration of accelerometer readings, or other processing of accelerometer readings as described above, the accelerometer mounted in a polished-rod dynamometer is calibrated to reference polished-rod positions measured by sensors of a sensor pod containing one or more of an optical gray-code angular position encoder, a 36-1 tooth wheel with variable-reluctance or optical tooth-passage sensors like those used for crankshaft position sensors, or another angular position or rotation sensor known in the art of sensing rotation or angular position.

Axial load 1008 in polished rod 224 or walking beam 236 may be plotted against polished-rod displacement 1006 or position on an enhanced surface card as illustrated in FIG. 5 to provide information on the well to service personnel.

In an alternative embodiment, monitoring device 260 and polished-rod dynamometer 261 polished-rod are used; both being configured to communicate with each other by digital radio. In embodiments the digital radio is a short range digital radio such as Bluetooth low energy (BLE). In this embodiment, a compensated accelerometer, optionally supplemented with a gyroscopic sensor, in walking-beam monitoring device 260 serves as an inclinometer to provide a present position in pumpjack cycle.

In a particular embodiment having a laser or ultrasonic rangefinder, the firmware is adapted to power-on the rangefinder when measurements are necessary, and power-off the rangefinder when the pumpjack is idle or measurements are not necessary, and to use range measurements to identify high and low reference points in the pumpjack cycle. In a particular embodiment, the rangefinder is turned on during startup until the pumpjack reaches a steady speed, then turned off until brief windows separated by multiple revolutions, when the rangefinder is turned on briefly to confirm a low or high point of the pumpjack cycle. In another particular embodiment, a processor of the polished-rod dynamometer 261 performs double-integrating of accelerometer readings to determine polished-rod position, since cycles are often predictable once operation has begun the accelerometers may be turned on only briefly to confirm peak acceleration and synchronize a timer to the pumpjack cycle and thereby conserve power.

In particular embodiments, a kinematic model of the pumpjack linkage system is simulated, providing a simulated accelerometer signal that is synchronized to actual accelerometer readings obtained by an accelerometer in the polished-rod dynamometer 261; in these particular embodiments we identify each end of stroke and then estimate displacement via interpolation. Since we know the stroke length, and in some particular embodiments we use a parameter determination method where we examine chunks of accelerometer data and adjust angle and angular rate parameters of the model to match the observed chunks of accelerometer data as well as possible. In another particular embodiment, for our expected slow pumpjack motion in a constrained path, we use frequency domain methods to determine a speed of the pumpjack and then apply it to known approximately sinusoidal motion of the polished rod to more accurately determine position.

Once data is logged by the polished-rod dynamometer, including motions of the polished rod and sensed vibrations, this data is used to generate a "surface card" as known in the art of oil well monitoring. The surface card represents conditions at the wellhead and can provide, or be processed with known algorithms to provide, useful information regarding conditions at pump and within the tubing. In a particular embodiment, a plot of polished-rod axial load sensed by strain gauges of polished-rod dynamometer, or vertical force applied to the polished rod as measured by a load cell of the polished-rod dynamometer, is plotted against polished-rod displacement as determined by at least one of the aforementioned techniques, is applied to the surface card. In a particular embodiment, an additional trace representing vibrations sensed by accelerometers of the polished-rod dynamometer 261 or walking-beam mounted monitoring device 260, plotted against polished-rod displacement, is also applied to the surface card to provide additional information to service personnel.

Since polished-rod diameter changes under high axial load, in an alternative embodiment the polished-rod dynamometer is "C" shaped and adapted to clamp to the polished rod, in this embodiment changes in polished-rod diameter are sensed by a strain gauge or load cell configured to sense changes in rod diameter. In other embodiments, strain gauges are oriented parallel to the polished rod to more directly detect axial forces on the rod.

Figure 3:
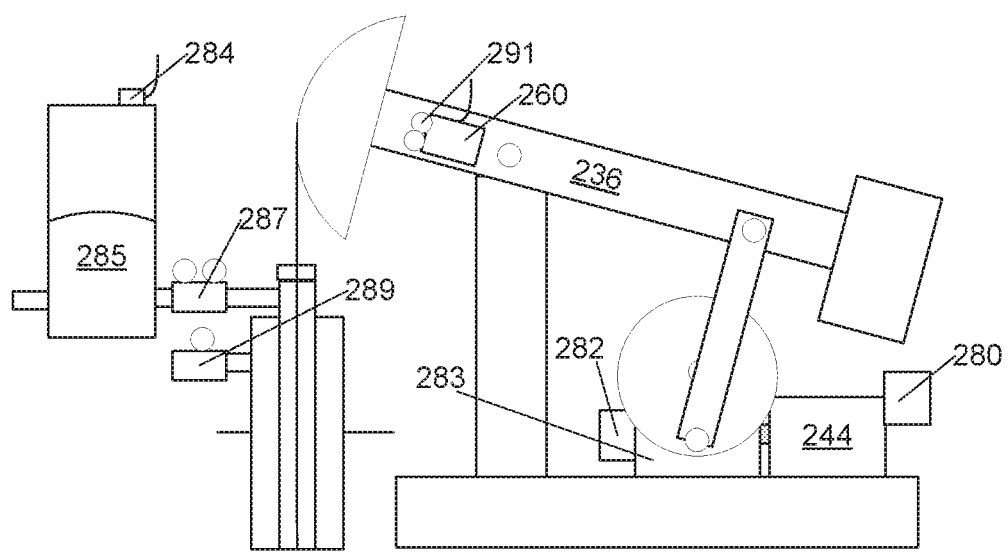
FIG. 3 illustrates several sensors for a rod-pumped wellhead.

Other sensors may be in separate pods and coupled by digital radio to monitoring device 260 and polished-rod dynamometer 261, which are attached to a pumpjack-equipped oil wellhead. For example, as shown in FIG. 3, a pumpjack may have current and voltage sensors 280 configured to monitor power consumption by motor 244, a temperature and level sensor 282 adapted to monitor oil of the pumpjack gearbox 283, and a thief-hatch monitoring sensor pod attached to an associated storage tank. For oil wells that do not pump directly into a pipeline, a level sensor, such as an ultrasonic level sensor 284, may be configured to measure oil in any associated storage tank 285. Other methods of sensing oil level in tank 285, such as comparing pressure at tank bottom and tank top, or a float gauge, may also be used in place of ultrasonic level sensor 284. A temperature sensor, pressure sensor 281 (shown in FIG. 4), and flow sensor assembly 287 may be configured to monitor oil flow from wellhead to storage tank or pipeline or detect attempted pumpjack operation with obstructions such as closed oil outlet valves 279 (shown in FIG. 4), and a pressure sensor 289 configured to measure pressure of gas in the tubing-well casing space. Embodiments may have monitoring device 260 on the walking beam 236 with strain gauges and/or vibration sensors attached to polished rod 224, or may have polished-rod dynamometer 261 on the polished rod 224 with a strain and/or vibration sensors on the walking beam 236. In an alternative embodiment, a load cell is used to directly sense forces applied to the polished rod instead of strain gauges. Other sensors may also be provided, such as an oil-in-casing level sensor (not shown), an ignition verification sensor on any flare used to flare-off gas from the casing, a polished-rod rotation sensor adapted to verify rotation, and torque required to rotate, sucker rods having attached paraffin scrapers, a hydrogen-sulfide gas sensor, pressure sensors for a hydraulic system such as may be used to close a downhole safety valve, valve position sensors, a security camera positioned to photograph any vehicle, including a thief's vehicle, that pumps oil from associated storage tanks, and other sensors as known in the art of oil-well wellheads. These sensors may be linked to the monitoring device 260 or polished-rod dynamometer 261 by short-range wireless using protocols such as ANT or BLU (Bluetooth).

In particular embodiments, rotation of the polished rod is observed by one or more of an optical gray-code angular position encoder, a 36-1 tooth wheel with variable-reluctance or optical sensors like those used for crankshaft position sensors, or another angular position or rotation sensor known in the art of sensing rotation or angular position. In embodiments, torque required to rotate the sucker rod is measured with diagonal strain sensors attached to the polished rod, with load cells embedded behind the worm gear typically used within rod rotators to drive a pinion gear attached to the polished rod, with a torque sensor mounted in-line with the polished rod, or another suitable torque-sensing sensor.

In embodiments having rotation and torque sensors, plots of polished-rod rotational angle 1010 and polished-rod torque 1012, plotted against polished-rod displacement 1006 as determined by at least one of the aforementioned techniques, is applied to the surface card shown FIG. 5. In particular embodiments, plots of tubing pressure 1014 or volume flow against polished-rod position, as measured by pressure sensors 281 at the pumping tee 277, may also be applied to the surface card FIG. 5.

In alternative embodiments, instead of using an inclinometer on the walking beam or an accelerometer on the polished rod to determine position in the pumpjack cycle, either a potentiometer or a rotary encoder may monitor driver, crank and/or walking beam position.

We also use the accelerometer to characterize specific machine noise, vibration, chatter, or banging behaviors and relate these to polished-rod displacement.

For an all-in-one dynamometer solution, we use one monitoring device or pod to measure both axial load (load) and acceleration of the polished rod, the same pod may also monitor polished-rod rotation.

We use individual high-resolution axially-oriented accelerometer signatures captured at several different pumpjack speeds throughout a required pumpjack speed range to develop a family of curves. This data is compiled into a function or interpolated to provide solutions for each pumpjack speed. Characterizing this family of curves permits gathering data at lower sampling frequencies and thus reduced power consumption while still providing sufficient accuracy.

More generally, in some embodiments we use inexpensive sensors and train them temporarily with a more expensive or less convenient sensor, such as an angular encoder. We then create models that extrapolate data from the inexpensive/convenient sensor to equivalents from the more precise sensor.

Training/Characterization Methods

Using the characterization method, we use the accelerometer data to "train" the system to output the correct displacement data. We have three methods of "training" the system:

In an embodiment, we use a "trainer" displacement or position sensor in a second device, such as walking beam monitor 260, that may include an inclinometer coupled to the walking beam. The trusted sensor may also be an angle sensor measuring angles or rotation of some other part of the pumpjack, such as the gearbox output shaft or crank, that along with the pumpjack's dimensions, can be used to accurately determine polished-rod positions. Alternatively, the trusted sensor may be a higher quality accelerometer located on the polished rod, that with associated processing can yield accurate position measurements, or an ultrasonic, laser, or other range sensing device adapted to measure distance between a location on the polished-rod and the stuffing box, a stationary reflector, or other stationary wellhead components. In this embodiment, the trainer sensor is used only during initial calibration and setup while running the pumpjack through a series of speeds throughout the usable range, capturing data from an internal accelerometer of the polished-rod dynamometer together with data from the training sensor to build a catalog of accelerometer signals with associated displacement as measured by the trusted sensor corresponding to a single stroke at each speed is built. The second device containing the trainer sensor may then be removed for general operation to reduce total cost of the overall solution by eliminating need for two permanent devices. During operation, the speed of the pumpjack is estimated though periodicity of the accelerometer signal and catalog data corresponding to that speed is used, interpolated as necessary, to provide a relationship between the measured acceleration and displacement usable to determine polished-rod position.

Since many pumpjacks have the same dimensions, the catalog of accelerometer readings with displacements at each speed need not be collected for pumpjacks that are essentially identical. Once a displacement catalog has been obtained for one particular model, it can be shared to polished-rod dynamometers on all similar pumpjacks.

In another embodiment, we use both pods, including the inclinometer located on the walking beam. The inclinometer is used to periodically reset and aid the double-integrated solution or may be used for a brief time to calibrate the double-integrated solution. This firmware senses new pumpjack speeds, then automatically turns on both sensors, calibrates the primary sensor in the polished-rod dynamometer 261, to the new speed and shuts off once "training" is completed. This minimizes initial configuration time and provides accurate data very shortly after operation while providing accurate data throughout the pumpjack operational life.

In another embodiment, over time a catalog of pumpjack "signatures" are developed for a given make/model/size of pumpjack allowing avoidance of the training portion of each new pumpjack altogether, allowing the sensor system to be pre-configured remotely prior to installation.

Inclinometer on the Walking Beam

An inclinometer measures the angle of the walking beam and the sensor pods use pumpjack geometry to determine rod displacement. Using accelerometer-based sensors for determining the angle is accurate at slow speeds, but at higher speeds it is susceptible to errors introduced by motion since accelerometers used as inclinometers assume the sensor's measurements are due to the local gravity. In particular, if an accelerometer is located at a distance, r, from the pivot point at the saddle bearing 240, the measurement will be a known combination of: gravity, angular acceleration proportional to r, and a square of angular velocity again proportional to r. If we know r, angular acceleration and the square of angular velocity, then the measurements can be "compensated" to provide a value for walking beam angle due only to gravity.

We use two methods to estimate angular acceleration and the square of angular velocity and hence compensate for these motion dependent errors:

Dual Accelerometer Compensation: with two or more accelerometers located at different points on the same rigid body undergoing planar motion (such as the walking beam), the differences in the measurements are used to estimate angular acceleration and the square of angular velocity Gyroscope Compensation: a rate gyroscope measures angular velocity directly. Numerical methods, such as Savitzky-Golay filters, are used to differentiate the measurements and obtain an estimate of angular acceleration without undue noise amplification. The square of angular velocity is obtained by squaring smoothed measurements. Since gyroscopic measurements may drift, bleeds or periodic resets of gyroscope signals may be performed when angular velocity is known zero.

Combining Polished-Rod Accelerometer and Walking-Beam Inclinometer Data

When both on-rod accelerometers and walking-beam inclinometers are available on the pumpjack, we use both technologies together to provide the best displacement measurement solution.

If both on-rod accelerometers and walking-beam inclinometers are available on the pumpjack at the same time, we use auto sensing to determine the optimum technology to utilize at any given speed to optimize data and power consumption, and may calibrate a lower-power less-accurate sensor type against readings of a higher-power more-accurate sensor.

When both on-rod accelerometers and walking-beam inclinometers or angular position encoders are utilized on the well, these are typically physically located in separate monitoring devices 260, or polished-rod dynamometers 261. We synchronize real-time clocks of these devices, polished-rod dynamometers, and pods to ensure that data gathered is synchronized. In a particular embodiment, each pod transmits readings captured with its sensor or sensors with a timestamp from its real-time clock. Since receiving devices or polished-rod dynamometers have a synchronized real-time clock and record their data with similar timestamps, the receiving devices or polished-rod dynamometers align data by timestamp, interpolating where need be, so each data point of polished-rod position and polished-rod axial load are captured as of the same time.

Thief Hatch Position Detection

Thief hatches are access hatches in oil storage tanks, such as are frequently collocated with oil wells not connected to an oil pipeline. Thief hatches are normally closed except for tank overpressure conditions when the hatch may open as a safety vent or times when the hatch is opened to sample or measure contents.

After tank overpressure events, thief hatches blown open may remain open leaking unnecessary greenhouse gas. We use accelerometers and gyroscopes, or magnets and magnetic field sensors like microswitches or Hall-effect magnetometer devices in sensor pod(s) attached to, or adjacent to, the thief hatch door to monitor thief hatch door position. When a change in position is detected, the status change is transmitted wirelessly to the monitoring device 260 or polished-rod dynamometer 261 for relay to a server or device (RTU, PLC, phone etc.).

Rod Rotator Monitor

Rod rotators 231 (FIG. 4) rotate the polished rod and thus the sucker rod using friction between a rod rotator gear of the rod rotator and a polished rod to rotate the polished rod 224. Typical rod rotators are operated as movement of carrier bar 223 and polished rod 224 raise and lower the rod rotator to cause a wire rope 221 to yank a handle 219 of the rod rotator and provide a rotary pulse of between one and fifteen degrees to the polished rod. Even a properly functioning rod rotator 231 does not ensure that the rod actually rotates and rod rotators can fail or the wire rope 221 connecting their actuating handle to a stationary pumpjack component can break. Further, the sucker rod may act as a lengthy torsion bar, with torque increasing with each rotary pulse applied to a jammed sucker rod, the rotator gear may then slip and the sucker rod then unwinds spinning the polished rod backwards (backspins), such that near-surface portions of the rod may rotate sufficiently to clear paraffin buildup in the tubing, but deep sections remain stationary allowing paraffin buildup. We provide a rod rotator monitor system that monitors actual rotation of the rod.

In an embodiment, a magnetometer or hall-effect magnetic sensor located in a sensor pod mounted near but not on the polished rod provides readings of magnetic response as the polished-rod dynamometer 261 rotates with the polished rod 224. If natural magnetization of the pumpjack and the earth's magnetic field together are insufficient to provide a strong, stable, signal as dynamometer 261 rotates; a reference magnet 217 may be attached to a non-rotating component such as the carrier bar 223 to provide a stable magnetic field detectable within the dynamometer 261A. A magnetometer or hall-effect sensor within the polished-rod dynamometer 261 then provides a sensor reading that varies with rotation of the rod.

The response of the magnetometer for full rotations is characterized to determine normal rotation of the device. Measurements available include speed of rotation, number of rotations in an interval, and in some embodiments having two magnetometers or hall-effect sensors, a direction of rotation.

In an alternative embodiment, the polished-rod dynamometer 261 includes calibrated rotational accelerometers and rate-gyro sensors to sense rotational accelerations of the polished rod 224 resulting from each yank of the handle 219 of the rod rotator during each stroke of the polished rod, or sucker-rod torsion unwinding events. Readings from the rotational accelerometer and gyroscopic sensors are processed by processor 302 operating under control of a rotation-monitoring firmware in memory 304 of the polished-rod dynamometer 261 to determine a rate of rotation of the polished rod. Determined rate of rotation is transmitted to the server by processor 302.

In an alternative embodiment, a stand-alone wireless polished-rod rotation monitor has at least one polished-rod rotation sensor including a magnetometer, an accelerometer, or a gyroscopic sensor; a processor; a real-time clock; a wireless communicator; and a memory. The memory has firmware directing the processor to read rod rotation-induced signals from the polished-rod rotation sensor and to transmit rod rotation data derived from those signals over the wireless communicator. In a particular embodiment, the at least one polished-rod rotation sensor includes all of a magnetometer, an accelerometer, and a gyroscopic sensor; the magnetometer configured to sense low speed rotation of the polished rod and the accelerometer and gyroscopic sensor configured to sense high speed rotation of the polished rod such as sucker-rod torsion unwinding events. This stand-alone wireless polished-rod rotation monitor is formed in a housing adapted to be mounted on the polished rod either above or below the carrier plate.

Tubing Rotation Monitoring

In some embodiments, a tubing rotator is also provided beneath the pumping tee 281 to rotate the tubing through which the sucker rod descends to the pump. In these embodiments, a wireless tubing rotation sensor may couple wirelessly to either a walking-beam mounted monitoring device 260 or polished-rod dynamometer 261 to provide tubing rotation data, processor 302 then transmits these tubing rotation data from the polished-rod dynamometer to the server.

In an embodiment, the wireless tubing rotation sensor resembles the stand-alone wireless polished-rod rotation sensor described above except that it is located in a housing adapted for attachment to the tubing below the stuffing box, pumping tee, and a second stuffing box that permits the tubing to rotate while allowing the pumping tee to remain stationary. In this embodiment, wireless tubing rotation sensor is adapted to mound on tubing having a significantly larger diameter than the polished rod.

Connectivity Modes

The monitoring devices herein described either operate independently or as a connected device to a local control system. In "independent mode", the device stores data on board until an authorized smartphone or other wireless device is within range and then connects either automatically or on demand to provide rod reciprocation and/or rotation data.

In "connected mode", the device connects wirelessly to a permanently mounted local wireless device, such as a pump off controller (POC) with wireless capability, at predetermined intervals and provides updates to the controller.

The monitoring device is configured to use wireless communications to partner with other monitoring devices, and to relay information from other monitoring devices to a server via any available compatible network(s) so long as at least one monitoring device of an oilfield can reach the server. Since oilfields are often located in remote areas, where cell telephone service is often poor, and some monitoring devices 260 will find themselves on the wrong side of walking beam 236 and therefore shielded from cell towers, or polished-rod dynamometer 261 may rotate with the polished rod to angles where it is shielded by polished rod 224 from cell towers, continual contact with cell towers may prove difficult. Relay capability within monitoring devices may allow all monitoring devices of an oilfield to communicate with a server when only a few devices are in range of, or in communication with, a cell telephone tower, or if a single IEEE 802.11 WiFi or other intermediate-range digital radio-equipped satellite-uplink data relay station is provided in the oilfield.

Figure 6:
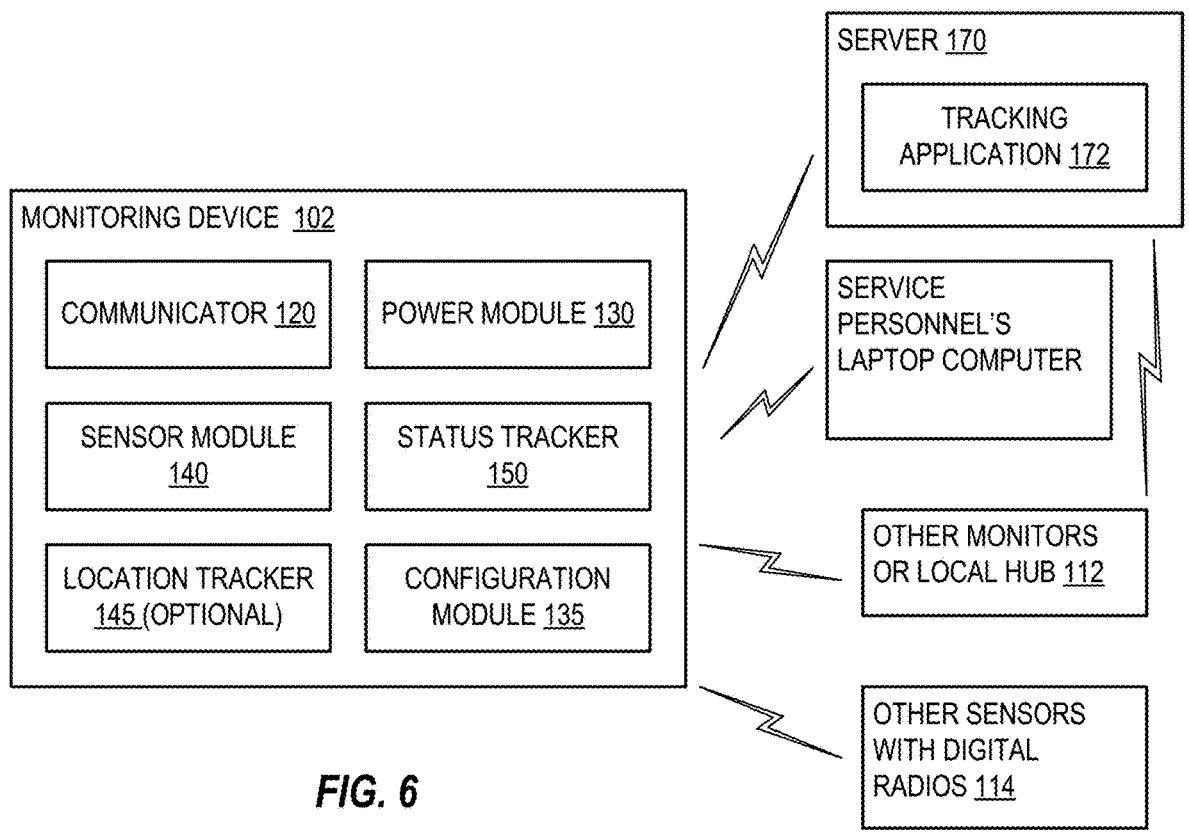
FIG. 6 is a high-level block diagram illustrating one exemplary monitoring device communicating with a server, in an embodiment.

FIG. 6 is a high-level block diagram illustrating one exemplary monitoring device (e.g. one or more of 102, 260, and 261) that communicates with report receiving devices such as server 170 and mobile devices such as a laptop computer, tablet, or smartphone associated with service personnel that may also perform analysis and display functions of server 170 or relay the reports to a separate server. In alternative embodiments, the report receiving device is another monitors or local hub 112 configured to relay reports to server 170. Monitoring device 102 includes a communicator 120, a power module 130, a configuration module 135, a sensor module 140, and a status tracker 150. In some embodiments, the monitoring device incorporates a location tracker 145. In certain embodiments, monitoring device 102 communicates with a server 170 or similar database on a single or distributed computer network of an operating oil company or oil-well service provider and may be accessible via the Internet. Monitoring device (e.g. one or more of 102, 260, and 261) is also in digital radio contact with other sensors equipped with short-range digital radio such as current and voltage sensors 280, temperature and level sensors 282 adapted to monitor oil of pumpjack gearbox 283, as well as level sensor 284, and temperature, pressure, and oil flow sensors assembly 287 and gas pressure sensor 289 of the well.

Server 170 includes a diagnostic system and status tracker 172 that tracks and records status of monitoring device 102 and associated oil well and pumpjack based upon sensor module(s) 140 of monitoring device 102. For example, server 170 stores the information from monitoring device 102, the identity of an associated oil well or pumpjack, the sensor data transmitted by monitoring device 102 associated with sensors module 140 of the monitoring device 102 and sensors in wireless communication with monitoring device 102, and may in some embodiments further process the sensor data with diagnostic routines to determine a fault condition based upon the sensor data.

Figure 7:
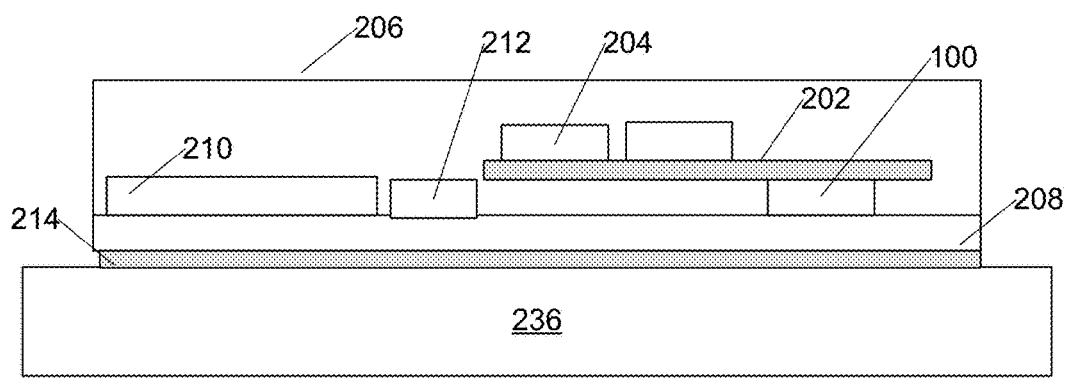
FIG. 7 shows the monitoring device of FIG. 6 implemented in a thin housing containing electronics, sensors, and a strain gauge internally attached to a backing plate that may be bonded to a pumpjack, in an embodiment.

FIG. 7 shows monitoring device 102 of FIG. 6 implemented as a housing 206 containing electronics that may be attached to a walking beam 236 of a pumpjack. In the example of FIG. 6, monitoring device 102 has components 204 configured on a PCBA 202. In embodiments, monitoring device 102 has a protective backing plate 208 to which strain gauges 210 and microphones 212 are attached. Housing 206 is weatherproof, waterproof and UV resistant. In certain embodiments, monitoring device 102 has a layer of adhesive 214 configured to attach it to walking beam 236. In certain embodiments, monitoring device 102 includes input/output devices such as a Universal Serial Bus (USB) port, lights, screens, touch interface and/or buttons.

While mounting strain gauges to a walking beam or polished rod directly typically requires a very clean environment, mounting the relatively-soft protective metal or polyimide backing plate 208 to the walking beam 236 or polished rod 224 is readily done in the field using epoxy resins or other adhesives 214. This backing plate 208 is formed of metallic, polymer or other suitable material and transmits strain-induced deformations of the walking beam or polished rod to strain gauges mounted on the backing plate. As strains occur in walking beam 236, these couple into backing plate 208 and are measurable by the strain gauges 210. In embodiments such as polished-rod dynamometer 261 attached to the polished rod, axial loads in the polished rod 224 couple into backing plate 208 and are measurable by strain gauges 210.

This type of mounting technology could be applied a broad range of industrial equipment—not just in the oil field.

Figure 10:
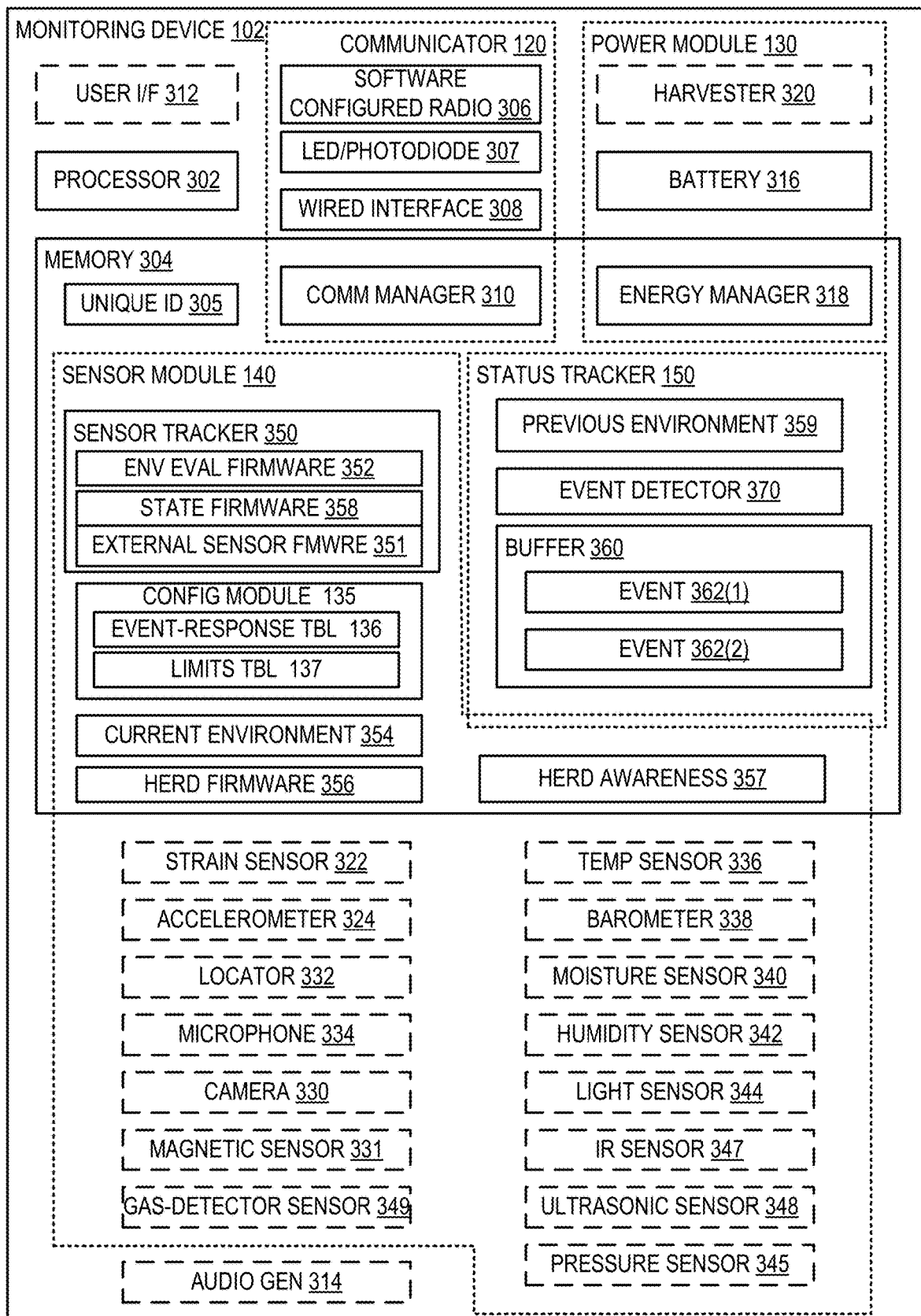
FIG. 10 shows the monitoring device of FIG. 6 in further exemplary detail.

FIG. 10 shows monitoring device 102 of FIG. 6 in further exemplary detail. Monitoring device 102 is a digital electronic device with at least one processor 302 communicatively coupled with a memory 304. Processor 302 is a digital processor that executes machine readable instructions (firmware) stored within memory 304 to provide functionality of monitoring device 102 as described herein. Memory 304 includes one or more memory types such as RAM, SRAM, DRAM, ROM, PROM, EEPROM, Flash, magnetic and optical memories. Processor 302 may have multiple operating modes, including a full power high speed mode, a reduced power lower-speed computation mode, and a "sleep" mode where power consumption of processor 302 is minimized. Each monitoring device 102 is configured with a unique identifier 305 recorded in a nonvolatile memory of configuration module 135. Configuration module 135 includes additional configuration settings located in the nonvolatile memory component of memory 304.

In a particular embodiment, configuration settings of configuration module 135 include cell phone frequency bands authorized in a particular jurisdiction in which monitoring device 102 is used, SSID and encryption keys or passwords for IEEE 802.11 (Wi-Fi) digital radio networks the monitoring device is configured to access, power configuration and energy manager settings such as a battery level below which high-energy communications modes such as Wi-Fi and cell-tower communications are not attempted, and other settings. Configuration module 135 in some embodiments includes a GSM SIM card to configure cell tower access, and in other embodiments information similar to that of a SIM card is recorded directly in nonvolatile memory of configuration module 135. In an embodiment, these settings are configurable over a wired port, such as a USB port or gigabit Ethernet port, and in other embodiments they are configurable using a short-range wireless link, such as a paired Bluetooth and/or ANT link. In yet other embodiments, some settings of configuration module 135 of monitoring device 102 are set using buttons and a display of monitoring device 102.

Power Sources

In embodiments, power module 130 has a battery 316 and an energy manager 318 including firmware stored within memory 304 and executable by processor 302 to manage power use by monitoring device 102 based upon energy stored within battery 316 and power available by energy-harvesting. In certain embodiments, where continuous power is readily available to monitoring device 102, battery 316 and energy manager 318 may be omitted; in these embodiments power is provided through a cable from the power source used to power motor 244 of the pumpjack. In some embodiments, battery 316 is replaceable. In another embodiment, monitoring device 102 with battery and energy harvester included is sealed and intended for a one-time application. Energy manager 318 includes firmware and hardware adapted to tracking a state of charge of battery 316, thereby determining available energy stored within the battery 316. Available energy in battery 316, as determined by energy manager 318, is used to define operating modes of monitoring device 102, including whether high-energy communications protocols like cellular network communications are enabled, and to trigger low-battery events to be sent to server 170 warning of low battery.

Battery 316 allows monitoring device 102 to operate during power interruptions, when the pumpjack is idle, or at night when solar energy harvesting fails. In certain embodiments, monitoring device 102 includes an energy harvester 320 that harvests electricity from external energy sources to charge battery 316. Harvester 320 may include one or more of a solar cell or panel, or a tilt-driven generator such as a generator with a magnetic pendulum and coil disposed so changes in tilt of monitoring device (e.g. one or more of 102, 260, and 261) as occur when walking beam 236 operates, causes pendulum movement relative to the coil. In embodiments such as polished-rod dynamometer 261, the energy harvester may incorporate a magnet having significant weight and mounted on a spring within a coil, as the rod is accelerated vertically during its cycle of motion the magnet moves within the coil and induces a current within the coil. In an alternative embodiment, a weight is mounted on an arm of piezoelectric material attached to a housing of the monitoring device, and induces voltage in the piezoelectric material as the piezoelectric material flexes with motion of the monitoring device.

In certain embodiments, monitoring device 102 optionally communicates wirelessly with an application on a smartphone to provide a user interface that allows a user to interact with monitoring device 102. For example, user interface 312 may include one or more of a display, which may be a touch-sensitive display, an input button, or a visual indicator such as an LED. inn other alternative embodiments, monitoring device 102 incorporates a user interface 312 that may include a display, one or more input buttons, or a visual indictor such as an LED for configuring or verifying operation of the monitoring device 102. Monitoring device 102 may also include an audio generator 314 that generates sound under direction of processor 302. For example, audio generator 314 may generate an alarm sound when monitoring device 102 determines that it, or the pumpjack it is attached to is faulty, or when the monitoring device 102 cannot reach server 170. In an alternative embodiment, audio generator 314 may generate diagnostic audio messages advising service personnel of a reason for an alarm.

Communication Networks

Communicator 120 allows monitoring devices (e.g. one or more of 102, 260, and 261) to communicate with other monitoring devices deployed in the same oilfield, whether attached to the same pumpjack or not, and server 170. Communicator 120 may include one or more single or multi-channel software-configurable radios (SCR) 306, such as a software defined radio or any other conventional radio chipset operable with software-configurable protocols. In alternative embodiments, communicator 120 may include one or more digital radios having hardware-defined communications protocols. Communicator 120 also includes communication manager firmware 310 that executes on processor 302 to enable short and long range wireless communications and configure and control SCR 306. In certain embodiments, monitoring device 102 includes a wired interface 308 that allows monitoring device 102 to communicate with wired networks. In certain other embodiments, monitoring device 102 includes both wired interface 308 and SCR 306 such that monitoring device 102 may use both of or either of wireless networks and wired networks. Since walking beam 236, or other components of the pumpjack, may obstruct digital radio in some directions, SCR 306 in some embodiments has a separate antenna 237 positionable atop or dangling beneath beam 236 in addition to an internal antenna.

Utilizing one or more of SCR 306, LED & photodiode 307, and wired interface 308, communication managers 310 is configured to use one or more protocols to communicate with at least one wireless or wired network.

Figure 11:
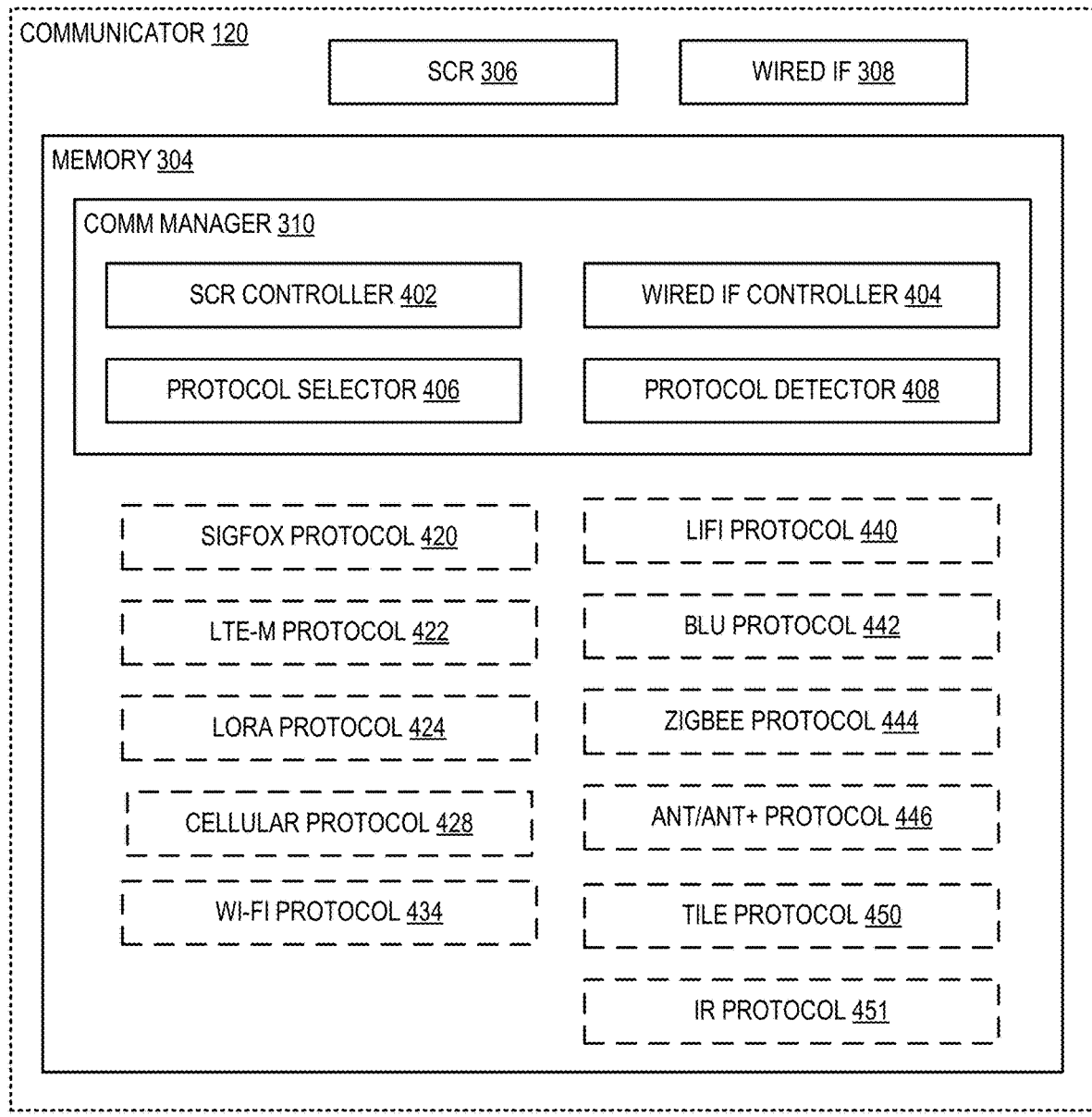
FIG. 11 shows a communicator of the monitoring device of FIGS. 1 and 10 in further exemplary detail.

FIG. 11 shows communicator 120 of monitoring device 102 of FIG. 6 in further exemplary detail. Communication manager 310 includes an SCR controller firmware 402 that configures and operates SCR 306 and a wired interface controller 404 that configures and operates wired interface 308. Communication manager 310 also includes a protocol selector 406 that selects one or more of protocols 420-451 for use by controllers 402 and 404; communications manager 310 operates according to configuration information stored in configuration module 135 and a current energy status determined by energy manager 318. In the example of FIG. 11, memory 304 stores configuration information and protocol firmware for one or more of a SigFox protocol 420, an LTE-M protocol 422, a LORA protocol 424, a cellular network data protocol 428, a Wi-Fi protocol 434, a LiFi protocol 440, a BLU (Bluetooth) protocol 442, a ZigBee protocol 444, and ANT/ANT+ protocol 446. In alternative embodiments, other protocols may be provided. Where any of these protocols require specific device pairing or SSID and encryption key or password combinations, necessary pairing information, SSID, passwords, and encryption keys are stored in configuration module 135. Memory 304 may include more or fewer protocols.

For configuring SCR 306, configuration module 135 and protocols 420-451 may define power and frequency rules for operating SCR 306, such that SCR 306 is configurable to implement both long range communications using cellular protocol 428, Wi-Fi 434, or SigFox 420 protocols, and short-range communication such as Bluetooth 442 or ZigBee 444 protocols that operate over short distances.

Using one of SCR 306, LED & photodiode 307, and wired interface 308, monitoring device 102 may communicate with a hub or router, such as a Wi-Fi router or a wireless network relay device or wireless network bridge, that in turn connects with one or more conventional networks such as the Internet, cellular telephone, or other networks operable over cable, optical, security, and electricity lines.

Where monitoring device 102 includes SCR 306 and both high-power protocols (e.g., Sigfox protocol 420) and low power protocols (such as, Bluetooth (BLU) or Bluetooth low-energy (BLE) protocol 442), protocol selector 406 selects the lower power protocol preferentially over high-power protocols to minimize power usage if both high and low power networks are available and in contact with server 170. For example, communication manager 310 may first try to communicate using a low power protocol such as BLU 442 or ANT/ANT+ 446 protocol, and when unsuccessful, then communicate using successively higher power protocols such as the Wi-Fi 434, Sigfox 420, and cellular 428 protocols. Once communication is established, communication manager 310 may learn of, or negotiate for, lower power protocols for future communication. Communication manager 310 thus implements a hierarchical strategy to reduce power consumption of communications by monitoring device 102. Once communication manager 310 successfully communicates (i.e., transferred a packet to a server 170 successfully as indicated by receiving a response packet), the protocol used for successful communications is stored for use during future transmissions, so unsuccessful protocols need not be retried during every communications attempt.

Figure 13:
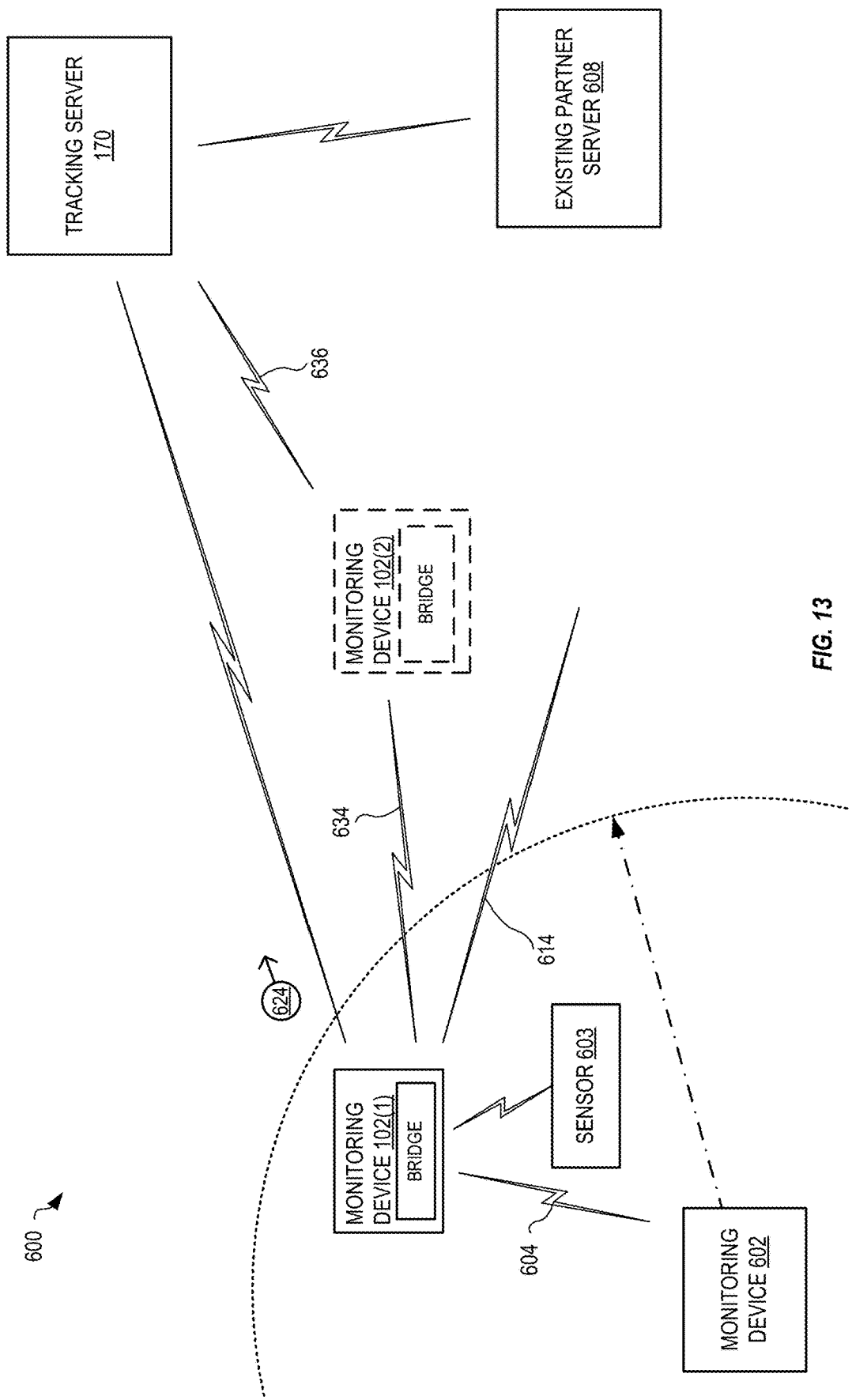
FIG. 13 shows one example scenario where the monitoring device of FIG. 1 increases the range of another monitoring device.

FIG. 13 illustrates an exemplary scenario 600 where monitoring device 102 of FIG. 6 increases the communication range of another monitoring device 602 or digital radio-equipped sensor 603.

Each monitoring device 602 not linked to a cell tower or Wi-Fi hub periodically transmits a beacon signal 604. Communication manager 310 of monitoring device 102(1), which is in range of beacon signal 604, includes a protocol detector 408 that controls SCR 306 (or wired interface 308) to detect a protocol of a signal being received, which in this example includes beacon signal 604, and, where possible, forms a network link to its sender. Where protocol detector 408 identifies a received signal as using 802.11 protocol 450, protocol detector 408 and/or communication manager 310 may determine that the signal is from a WiFi hub or router and attempts to connect with it if configured with an appropriate password.

Monitoring device 102 may bridge between two networks that may or may not use different protocols. The monitoring device may, for example, link to a digital cellular telephone tower using one protocol, and link to and relay messages from a second monitoring device using a WiFi 802.11 protocol, acting as a WiFi hotspot.

Monitoring device 102 may also link to other sensors 603 using ANT, BLU, or other short range protocols to give fluid levels in storage tank, moisture, gas and fluid pressures, temperatures, currents, and voltages. Monitoring device 102 in turn relays sensor data to server 170 for storage and analysis.

In another example, protocol detector 408 identifies a received signal as being from another monitoring device 102. Monitoring device 102(2) may receive signal 634 from monitoring device 102(1) indicating monitoring device 102(1) is unable to reach server 170. Communication manager 310 of monitoring device 102(2) then forwards the signal from device 102(1) to server 170 via a previously used path, or via an alternative path and/or protocol; if monitoring device 102(2) is configured to allow higher power operation or additional protocols than monitoring device 102(1), or is subject to different signal obstructions than monitoring device 102(2), monitoring device 102(2) may reach server 170 while monitoring device 102(1) could not—this is particularly likely if monitoring device 102(1) is conserving battery energy by restricting itself to low-power protocols, while monitoring device 102(2) is drawing power through a cable, or where monitoring device 102(1) is shielded by beam 236. Where server 170 sends a response to monitoring device 102(1), communication manager 310 of monitoring device 102(2) may retransmit this response in the protocol used by monitoring device 102(1) to monitoring device 102(1). Thus, communication manager 310, operating within each monitoring device 102 forms a mesh network of multiple monitoring devices to relay information between each monitoring device 102 and server 170.

For purposes of this document, satellite navigation signals include one or more of global satellite-based navigation systems such as Russia's GLONASS, the US GPS (Naystar), EU's Galileo, China's BeiDou or BeiDou-2, regional satellite-based navigation systems such as India's IRNSS (NAVIC), and satellite navigation enhancement signals such as WAAS (Wide Area Augmentation System), GAGAN (an augmentation system for use with India's IRNSS or NAVIC satellites), or similar systems. In some embodiments, location is determined from satellite navigation signals.

In alternative embodiments, instead of SCR 306, monitoring device 102 incorporates one or more digital radio circuits. These digital radio circuits provide functionality for those protocols and bands that they are adapted for operation with; particular digital radio circuits that may be incorporated within monitoring device 102 include IEEE 802.11 compatible digital radio circuits, digital cell telephone network compatible circuits, Bluetooth-compatible circuits, and other digital radio circuits known in the art of digital radio. In embodiments having such radio circuits configurable for more than one protocol, or where radio circuits for more than one protocol are provided, the signal relay and other functions described with reference to SCR 306 are supported where compatible with provided digital radio circuitry.

Figure 14:
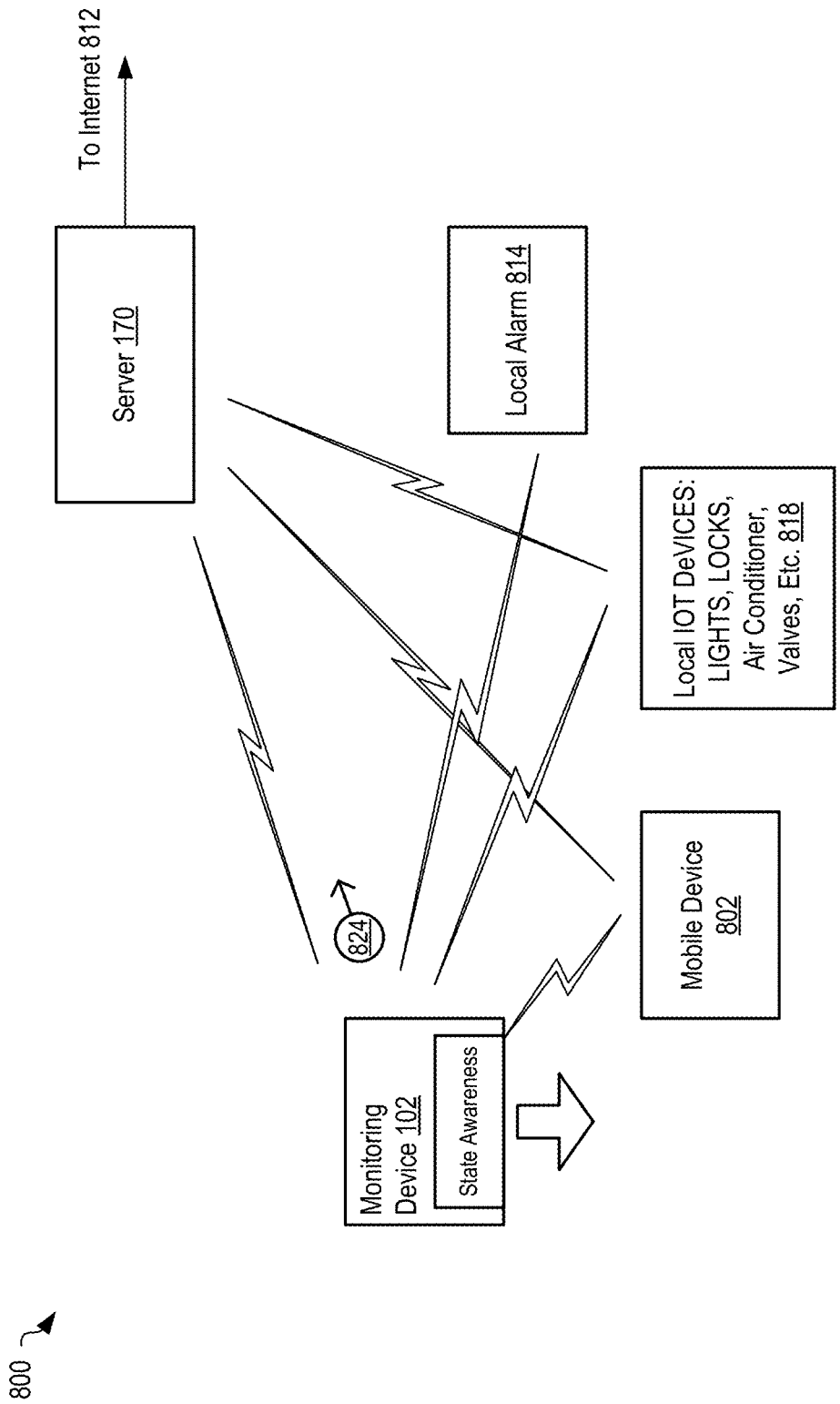
FIG. 14 shows one exemplary scenario where the monitoring device of FIG. 6 operates in a state awareness mode, in an embodiment.

In embodiments, the communications module establishes communications with nearby mobile devices 802 (FIG. 14) such as laptop computers, tablets and Bluetooth-enabled cell phones. An application running on the laptop computer, tablet, or cell phone is then able to query sensor data logged within the monitoring device and provide diagnostic information to service personnel.

Bumblebee Data Collector

Figure 16:
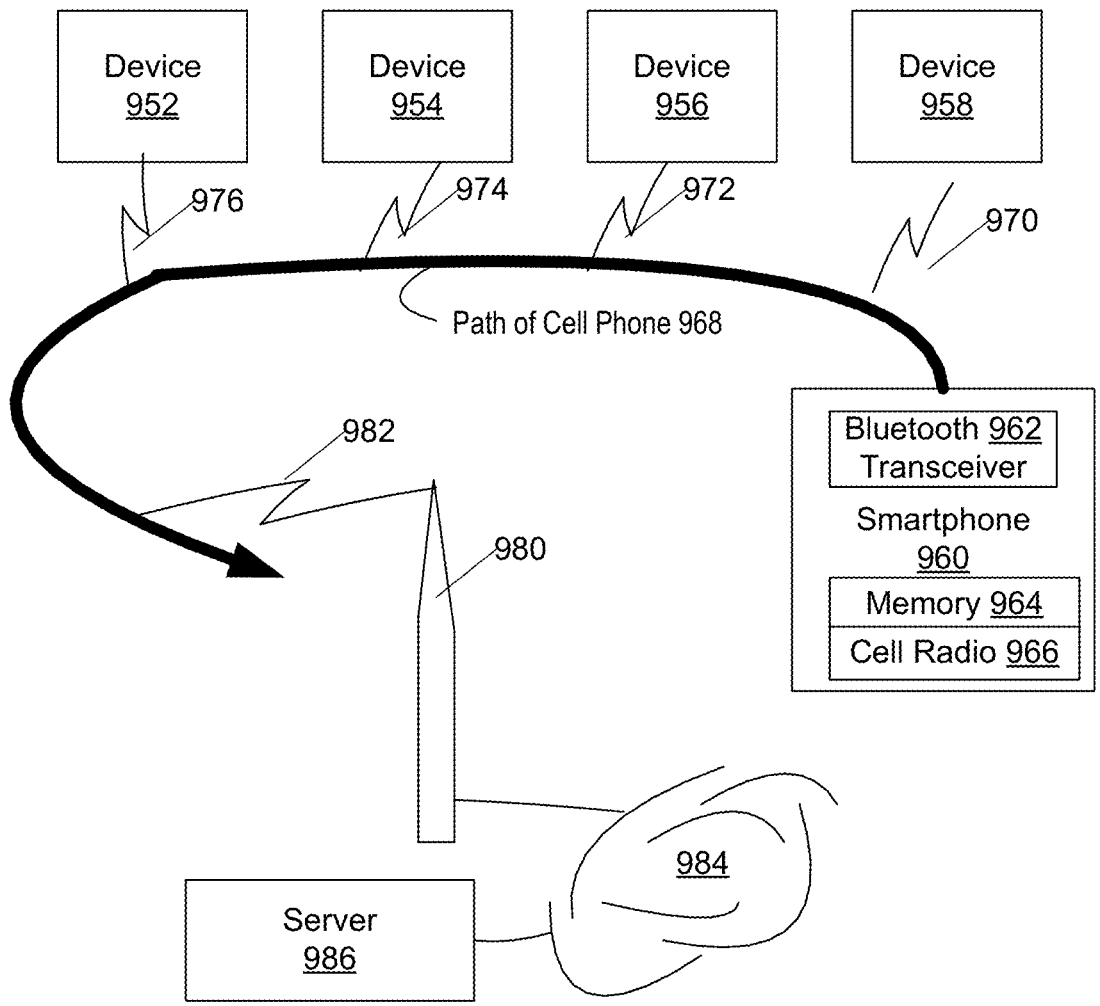
FIG. 16 illustrates a "bumblebee" method of collecting data from multiple monitoring devices with a collection smartphone device that relays data to a server when connected.

Many industrial locations have limited connectivity. In many of these situations adding connectivity can be cost prohibitive or limit application of a technology. In these cases, as illustrated in FIG. 16, a solution provides "near" real-time data connectivity through wireless handheld devices, such as smartphones or tablet computers, operating as a "bumblebee" collection device. In an alternate embodiment, a drone is used as a bumblebee collection device, passing over oil wells to collect data.

Consider a group of monitoring devices 952, 954, 956, and 958 attached to one or more nearby pumpjacks. The bumblebee collection device, here illustrated as smartphone 960, has a short range digital radio 962 such as Bluetooth, BLE (Bluetooth low energy), or ANT+) any of which are referred to herein as Bluetooth radios. Collection device or smartphone 960 also has memory 964 incorporating a bumblebee data collection app and data storage, and a cellular data protocol digital radio 966. The smartphone 960 follows a path 968 as it is carried by a worker while the worker services a particular well associated with monitoring device 956. As the worker passes near a first monitoring device 958 associated with a different well, the Bluetooth radio 962 of the smartphone 960, or another digital radio of the monitoring device 958 and the smartphone 960 make contact and download 970 collected data from memory of the monitoring device 958 to memory of the smartphone 960. Similarly, as the smartphone continues along the path 968 the digital radio the monitoring device 956 and Bluetooth radio 962 of the smartphone 960 make contact and download 972 collected data from memory of the monitoring device 956 to memory of the smartphone 960. While the worker tinkers with the well associated with monitoring device 956, collected data is downloaded 974 from monitoring device 954 to smartphone 960. As the worker leaves the oilfield, he may pass by more monitoring devices 952 from which data are downloaded 976.

Once data is collected by smartphone 960, the smartphone 960 waits until a strong signal is heard from a cell tower 980; upon linking to cell tower 980 the smartphone uploads 982 all the downloaded data through cell tower 980 onto the internet 984 and thence to a server 986. In an alternative embodiment, the smartphone retains data until it can establish an IEEE 802.11 Wi-Fi connection with a known network, whereupon the smartphone uploads all downloaded data onto the internet 984 and to server 986.

The use of cell phone to gather data can either be done in the background without the operator's knowledge or intervention or on demand, according to a configuration of smartphone 960.

Each monitoring device has data storage adapted to record data when no smartphone is around and when each monitoring device cannot reach a network directly. Downloading data from monitoring devices happens when a smartphone or other bumblebee data collecting device is available and near enough to make good contact.

The data can be gathered from either designated sensor pods or from other established systems such as an owner-operators control system or supervisory control and data acquisition (SCADA) systems (such as Pump Off Controller (POC'), Programmable Logic Controller (PLC's), or Remote Terminal Unit (RTU's)) that have information that could be collected.

Controlling Pumpjacks

This system can be used for data gathering and/or control.

A "reasonably real-time" response is achieved where the smartphone is used for data gathering while the cell phone has access to cellular networks. In this event data transmission to the server or cloud based controller may be immediate with data is received back from the controller and transmitted back to the controlled device/system. In this case, the data may be analyzed, appropriate action recommended, and sent back to the smartphone in essentially real time; if the operator carrying a cellphone is on site at a well his cellphone can upload live data to the server, have it analyzed for control recommendations and the operator may receive a text message to alter well parameters by, for example, speeding up the well.

Delayed response occurs when a smartphone collecting data is either not in cellular coverage range or the operator chooses not to utilize the cellular connection and uses alternate connectivity such as 802.11 Wi-Fi from his office to upload the data and download control information. In some cases delayed response may be adequate. An example of this would be a control system on a well that changes slowly over time (over weeks), where latency or delay in control response time on the order of days may be acceptable.

In an embodiment the operator does not need to have the smartphone leave the truck as long as it is within connectivity range of the short-range digital radios embedded in monitoring devices (e.g. one or more of 102, 260, and 261). This is particularly advantageous for hazardous locations where cell phones are not permitted. If range permits, the operator can drive near the sensing device, the smartphone auto-connects to the sensor, and the smart phone collects data stored since the last visit.

This remote data gathering is relevant generally in many industry, commercial and consumer applications beyond oilfields. Essentially any sensor that is wirelessly (e.g. BLE) enabled but lacks cloud connectivity whether due to an absence of nearby cell towers or for other reasons, may have its data collected by bumblebee collectors.

Bumblebee data storage and transfer devices may be retrofitted to existing fully-wired devices in other embodiments.

Sensors

Sensor module 140 includes intelligence, such as motion and sensor tracker 350 firmware that utilizes environmental information from one or more sensors 322-349 to determine and/or track motion, vibrations, sounds, environmental gasses, and/or changes in the environment of monitoring device 102. As shown in FIG. 10, monitoring device 102 includes one or more sensors, such as a strain sensor 322, an accelerometer 324 or inclinometers, a camera 330, a GNSS/GPS locator 332, a microphone 334, a temperature sensor 336, a barometer 338, a moisture sensor 340, a humidity sensor 342, a light sensor 344, IR sensor 347, a magnetic sensor 331, an ultrasonic sensor 348, a gas detector sensor 349, and pressure sensors 345.

In an embodiment, monitoring device 102 monitors microphone 334, and classifies sounds detected, including for example screech of a failing saddle bearing, or audible alarms sounding from nearby devices. Sound classifications are checked against a list of events represented by those sounds, and an event generated.

When events are generated from significant sensor reading changes, classified sounds of certain types, or other critical sensed events like excess pressure, gas leakage, or an open gate of fencing around a pumpjack occur, desired actions are looked up in an event-response table 136 of configuration module 135. If an event has a designated response, a message indicating that the event has occurred is transmitted to server 170 by a nearby mobile device 802 (FIG. 14), and, in some embodiments, an associated pre-configured command is transmitted to a local IOT (internet of things) device 818 such as an alarm or a power-control switch of pumpjack motor 244. In these embodiments, the monitoring device (e.g. one or more of 102, 260, and 261) may be configured to shut down pumpjack motor 244 when the gate is open. Monitoring device 102 may also activate an alarm or turn off a pump jack motor when bearing failure is detected.

Sensor tracker 350 has firmware including machine readable instructions stored in memory 304 and executed by processor 302. Sensor tracker 350 may include an environmental evaluator firmware 352 that, at least periodically, processes information from one or more internal sensors 322-349 and, using external sensor firmware 351, external sensors, to determine a current physical environment 354; the current physical environment is temporarily stored in memory 304 of monitoring device 102. Current environment 354 may indicate one or more of acceleration, current walking beam 236 angle, rotational movement, ambient light level, a current geographic location, ambient noise level, ambient temperature, ambient barometric pressure, ambient humidity, motor currents and voltages, and information observed by any other sensors of, or linked to, the monitoring device.

Environmental evaluation firmware 352 compares current environment 354 to a previous environment 359 stored within status tracker 150 in memory 304 to determine environment change events. For example, where accelerometer 324 indicates a series of accelerations differing from those of normal pumpjack operation, or a pattern of stresses in beam 236 differing from those of normal pumpjack operation, event detector 370 of status tracker 150 may determine that the oil level has fallen below level of pump 222 and generate an appropriate event 362(1) message, stored within buffer 360 of status tracker 150 in memory 304, to indicate the low oil. Other event messages determined from stress, vibration, and sound by digital processing with monitoring device 102 may indicate breakage of the sucker rod, leakage of pump 222 valves or tubing splits, and bearing failures. Still other events include excessive methane gas concentrations at monitoring device 102 and failure of the stuffing box. Event 362(1) is timestamped with a date and time, and stored in status tracker 150 memory.

If current energy levels and network connectivity permit, communication manager 310 may immediately send event 362(1) to server 170, whereupon diagnostic system and status tracker 172 notifies service personnel.

Locator 332 may be a GPS receiver that provides precise location sensing instead of relying on location records in server 170, thereby assisting service personnel in reaching a failed oil well.

Sensors 322-349 may also be used to determine status and health of the pumpjack. A change in vibration levels or other sensor inputs such as flows and pressures may indicate a change of state or deterioration in performance of the pumpjack that might otherwise go unnoticed. Microphone 334 and/or audio generator 314 may be used to listen to the environment for unusual events.

In an embodiment, strain sensor 322 is read by processor 302 of monitoring device 102 and compared to preconfigured axial load limits in configuration module 135. Periodic fast-Fourier transforms of a sequence of readings of strain sensor 322 and accelerometer 324 are performed to determine vibration frequencies and magnitudes. These vibration frequencies and magnitudes, together with peak readings of the strain sensor 322 and accelerometer 324, are compared to limits in a limits table 137 in the configuration module 135 and, upon limits being exceeded, events are generated. Events are looked up in an event-response table 136 of configuration module 135 to retrieved predetermined responses. Actions set in the event-response table 136 for excessive vibration or excessive axial load may, for example, include sending a message indicating the event to server 170 and mobile device 802 (shown in FIG. 14), and, in some embodiments, sending an associated preconfigured command to a local alarm 814 or IOT device 818. In a particular embodiment, IOT device 818 is a power switch coupled to control power to the pump-jack, and the preconfigured command turns off the pump-jack upon excessive axial load or vibration in the pump-jack.

Temperature sensor 336, barometer 338, moisture sensor 340 and humidity sensor 342 allow monitoring device 102 to determine ambient conditions. In one embodiment, monitoring device 102 generates an alarm when wet.

Light sensor 344, IR sensor 347, ultrasonic sensor 348, and camera 330 may allow monitoring device 102 to provide clues as to other oil wells in the vicinity. In a particular embodiment, a camera may obtain images of the vicinity to provide additional information about the environment where monitoring device 102 is located; these images may allow an operator to triangulate of plumes of smoke to locate nearby fires.

Light sensor 344 may allow monitoring device 102 to implement power savings such as by waking up other components of monitoring device 102 when daylight is detected and monitoring device 102 is likely to be in a high-energy state through an energy-harvester 320 incorporating solar cells.

Magnetic sensor 331, which may be a hall-effect sensor, allows firmware to detect approach of nearby objects marked with a magnet; for example, if a magnet is placed on top of the stuffing box 226, magnetic sensor 331 sense magnetic field from that magnet and allows firmware to determine when polished-rod dynamometer 261 is near stuffing box 226 at the bottom of a horsehead or walking beam stroke, and when polished-rod dynamometer 261 is far from the stuffing box at the top of the stroke.

In an embodiment, ultrasonic sensor 348 emits ultrasound into walking beam 236 to which monitoring device 102 is attached. The ultrasonic sensor is configured to detect surfaces, such as the interface of back plate 208, adhesive 214 and beam 236, and may additionally detect cracks within the beam. In these embodiments, sensor module 140 records reflectivity and distance to these surfaces, and status tracker 150 is configured to observe significant changes in reflectivity and distance. Upon detecting significant changes in reflectivity and distance of these surfaces indicative of detachment of monitoring device 102 from beam 236, such as a change in reflectivity of the interface of adhesive with beam 236 and an increasing range to surfaces within the object, monitoring device 102 is configured to transmit a message to server 170, warning that beam 236 and monitoring device 102 have separated.

Off-Line Data Recording

In certain embodiments, memory 304 implements one or more first-in, first-out buffers 360 that store events 362 when monitoring device 102 is unable to communicate with server 170. Events 362 remain within buffer 360 until communicated to server 170, downloaded to a Bumblebee collector, or until buffer 360 becomes full, when the oldest event 362 is discarded to allow a new event 362 to be inserted into buffer 360. Thus, events 362 are not immediately lost due to a lost communication with server 170. When monitoring device 102 reconnects with server 170, monitoring device 102 transfers "waiting" events 362 from buffer 360 to server 170. Diagnostic system and status tracker 172 on server 170 processes received events 362 and generates a report of events of monitoring device 102 for interested service personnel.

Expected Behavior Patterns

Figure 12:
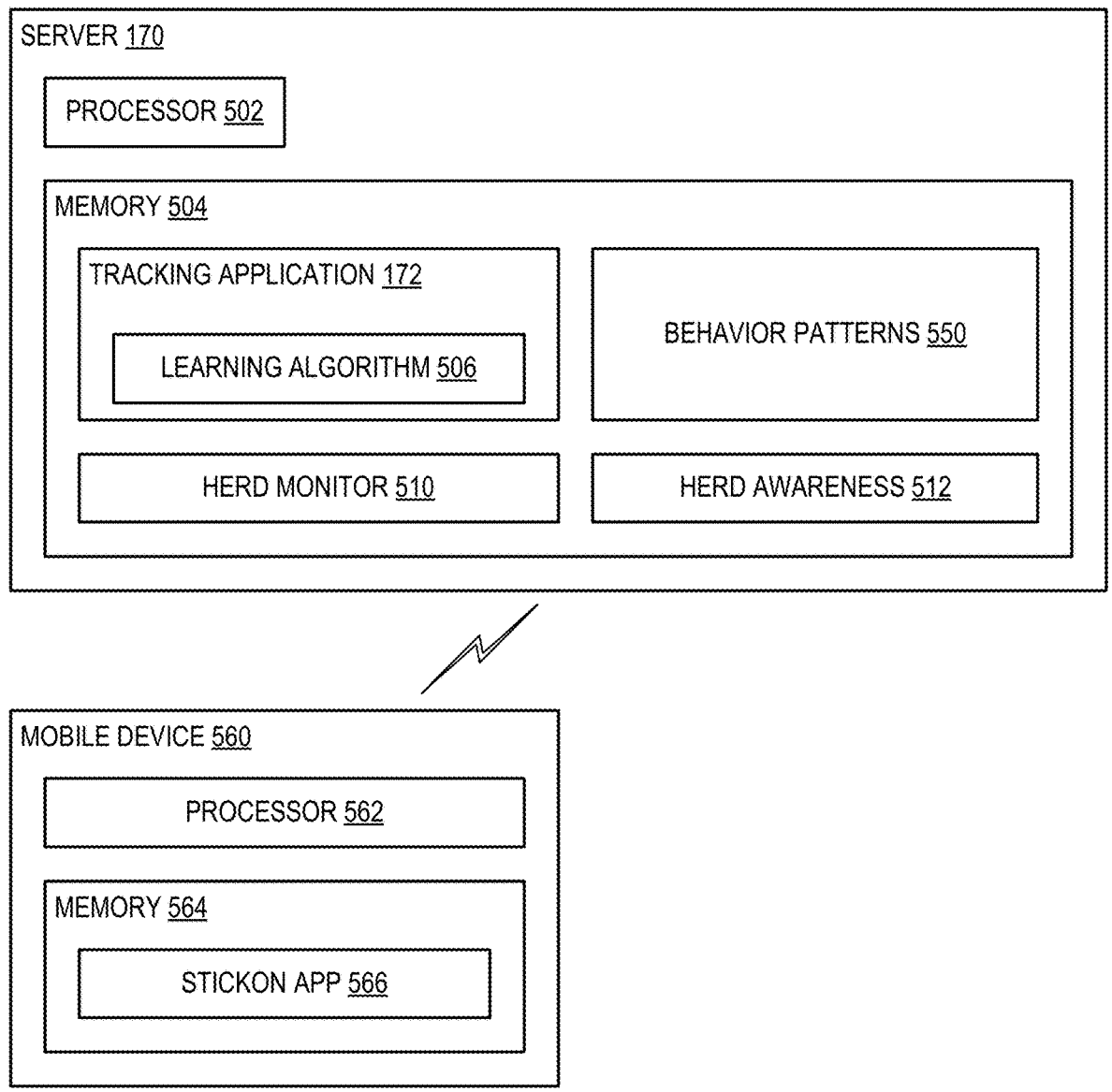
FIG. 12 shows the server of FIG. 6 in further exemplary detail.

FIG. 12 shows operation of server 170 in further exemplary detail. Diagnostic system and status tracker 172 processes events 362 from monitoring device 102 to determine a current status of pumpjack 235. Diagnostic system and status tracker 172 may include learning algorithm(s) 506 that track behavior patterns 550 of pumpjack 235 such that "normal" and thus "expected" behavior of pumpjack 235 is determined, such as vibrations at particular positions of walking beam 236, or high but not excessive load on polished rod 224. When processing newly received events 362 from monitoring device 102, diagnostic system and status tracker 172 may determine whether events 362 indicate expected behavior, or that events 362 indicate unexpected behavior that needs clarification with service personnel.

FIG. 12 shows a mobile device 560 with a processor 562 and a memory 564. Mobile device 560 is selected from the group including a smart phone, a tablet, a laptop, and other mobile computing devices. Memory 564 of mobile device 560 contains a monitoring device app 566 with machine readable instructions executed by processor 562 to enable mobile device 560 to communicate with monitoring device 102 and/or server 170 and access sensor data and past and current events.

Modes of Operation

Monitoring device 102 may be configured to operate in one or more operational modes, and may also have a low-power "sleep" mode.

Monitoring device 102 may be configured to wake-up when internal accelerometers detect motion of walking beam 236 since many issues with wells that are of interest to service personnel are detectable by measuring device 102 only when the walking beam is moving.

Where two or more monitoring devices 102, or external sensors linked to a monitoring device, are within communication range of one another, they may share environmental information. For example, where monitoring devices (e.g. one or more of 102, 260, and 261) are configured with different combinations of sensors 322-349, each may learn additional environmental information from the other monitoring devices or from nearby wireless-equipped sensor pods. Where each monitoring device (e.g. one or more of 102, 260, and 261) has similar sensors, sensor data may be shared and compared to determine additional information about the environment. For example, if each monitoring device (e.g. one or more of 102, 260, and 261) includes an accelerometer 324, where multiple monitoring devices 102 simultaneously detect movement unassociated with pumpjack operation, they may determine an earthquake has occurred and shut down pumping to avoid spillage. In a similar manner, information from different classes of sensors within monitoring device 102 or between several monitoring devices (e.g. one or more of 102, 260, and 261) may be fused to learn more about the local environment, such as a relative position of a sounding alarm, or a relative position of a gas leak or wellhead fire.

In an alternative embodiment, a first and a second monitoring device 102 may be configured to compare their sensed environment and report any significant difference in their environment. This configuration is particularly useful where fire may occur because excessive temperatures in some parts of an oil field where temperatures are normal in other parts of the field may indicate fire.

First monitoring device 102 may determine it should operate as a "hub" monitoring device 112 that aggregates signals from other monitoring devices 102 of a group or herd. In a particular embodiment, hub monitoring device 112 has a larger energy harvester than other monitoring devices 102, providing additional energy for communications with both other monitoring devices and long-range communications such as to cell phone towers. In another particular embodiment, hub monitoring device 112 is physically identical to other monitoring devices 102 but has been configured to act as a hub monitoring device 112. In yet another particular embodiment, monitoring devices 102 communicate their energy levels, and a monitoring device 102 is dynamically selected from those monitoring devices in contact with large numbers of monitoring devices of the herd and having high energy to act as hub monitoring device 112; in this embodiment the designation of hub monitoring device 112 may be rotated among high-connectivity monitoring devices 102 to distribute power consumption.

When operating as a hub, hub monitoring device 112 may operate its own local network and collect signals directly from other monitoring devices 102 in its vicinity, and, where hub monitoring device 112 can communicate directly with some but not all monitoring devices 102, also collect signals relayed by other monitoring devices 102 that are in direct communication with hub monitoring device 112. Then, when prompted and/or periodically, hub monitoring device 112 uploads environmental changes, data and events through a cellular or Wi-Fi network to server to server 170, or to any nearby device which can reach tracking server 170. Signals relating strictly to network organization and configuration are not relayed. In certain embodiments, hub monitoring device 112 is in continual contact with one or more networks.

Examples of Use

Monitoring device 102 may also extend the coverage of a wireless network and/or change the topology of the network. For example, where multiple monitoring devices 102 each implement IEEE 802.11 Wi-Fi protocol 434 and have sufficient power available, they may extend Wi-Fi coverage within an oilfield.

Figure 15:
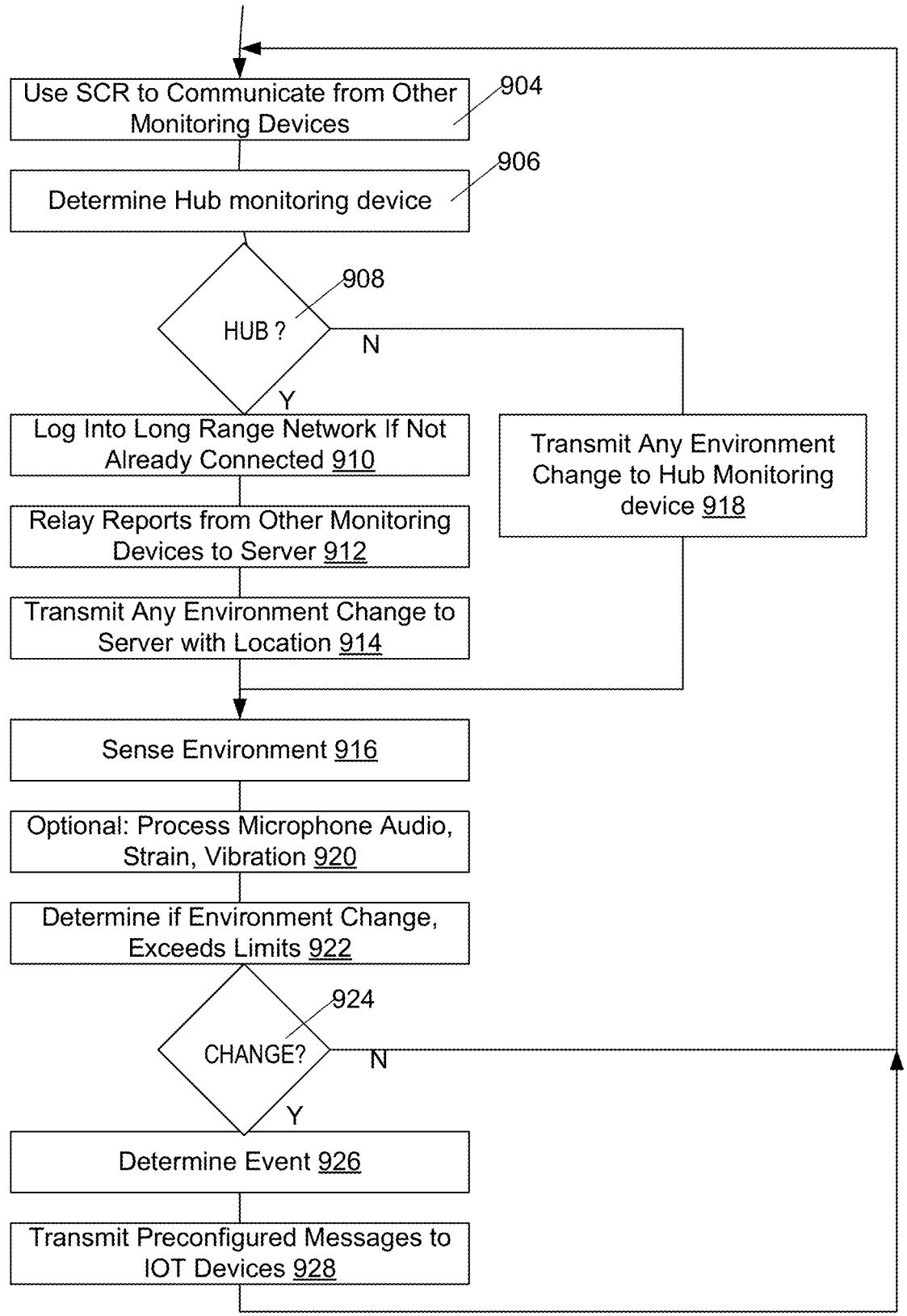
FIG. 15 is a flowchart illustrating actions taken by an embodiment of the monitoring device.

In an embodiment, assuming sufficient energy is available to use high-powered radio modes; monitoring device 102 operates as illustrated in FIG. 15. Monitoring device 102 listens for and communicates 904 with other monitoring devices in the local area. If there is a second monitoring device in the area, a hub monitoring device is determined 906. If monitoring device 102 is the determined hub, and a long-range network such as a cellular telephone network or a Wi-Fi network for which monitoring device 102 has access exists locally, monitoring device 102 logs in 910 to that network to enable communications between monitoring device 102 and server 170 over that network.

If 908 acting as a hub, monitoring device 102 relays 912 any reports it receives from other monitoring devices to server 170. Monitoring device 102 also sends any environmental change or pumpjack status change (an event) it has observed to the server. Once any event is sent to server 170, monitoring device 102 continues sensing the local environment 916 including status of the pumpjack.

If 908 monitoring device 102 is not designated hub, monitoring device 102 transmits 918 events to the designated hub monitoring device 112 and continues sensing 916. Any audio, strain readings, or accelerometer readings needing processing to classify them are processed 920. Then environmental changes are compared 922 to limits in limits table 137 to determine if a reportable change or event has occurred. If 924 no reportable change has occurred, monitoring device 102 continues using the SCR to communicate with any other nearby monitoring devices 904. If 924 a reportable change has occurred, an event report is formatted with the change. The event is looked up in event-response table 136 to determine whether any commands should be sent to local alarms and IOT devices 818. If commands should be sent to IOT devices 818 (such as a power controller for motor 244) or local alarms, those commands are sent 928 using an appropriate protocol before monitoring device 102 continues using the SCR to communicate 904.

Correlation of Sensors

The monitoring device contains firmware for correlating sensors. For example, accelerometers of monitoring device 102 can sense beam angle, as well as vibration. Vibration, or high axial load, at particular beam angles can indicate certain failure modes of the wellhead and pumping system such as clogged tubing; when excessive axial load occurs at certain beam angles an appropriate event 362 is generated.

Upon a storage-tank level sensor, such as level sensor 284, indicating tank full, a tank-full event is generated and transmitted to server 170, if configured in the event-response table, a command to shut off motor 244 is then sent to a motor controller. Where oil or gas pressure at the wellhead exceeds limits, an overpressure event is generated and transmitted to server 170 and, if configured, a command to shut off motor 244 is transmitted to a motor controller. Similarly, since rapid temperature changes at a wellhead can indicate stuffing box 226 leaks, upon sudden changes of temperature an event is generated and transmitted to server 170.

In many embodiments, when server 170 determines an action required by an IOT device, such as a pump controller or valve actuator, it may transmit a command to monitoring device 102, which then relays the command to the appropriate connected IOT device.

Repetitive Motion Sensing for Industrial Use

Large industrial equipment often has repetitive motion associated with the machine. We apply this technology to any repetitive motion—it can be called a "repetitive motion sensor".

Combinations of Features

The various features herein disclosed may appear in many combinations, and many features described in this application and paragraph may be omitted while still gaining useful information about an oil well pumpjack. For example, a dynamometer having a strain sensors to measure axial load of polished rod may receive rod position information from external sources such as a rotation angle encoder or 36-1 tooth wheel sensor, an internal accelerometer with either simple double integration or with higher resolution from signal processing techniques described herein, an inclinometer attached to the walking beam of the pumpjack with or without acceleration compensation performed in the polished-rod dynamometer, magnetic sensors, or other sensors. The same polished-rod dynamometer can optionally receive polished rod or tubing rotation information from angular accelerometers and/or gyroscopes or magnetic sensors within the dynamometer, rotary position encoders, magnetic, or optical sensors external to the dynamometer, and torque from a number of sources including properly positioned load cells or strain gauges. The same polished-rod dynamometer can sense polished-rod axial load by monitoring change in diameter of the polished rod potentially with a load cell or strain gauges applied to a C-clamp, by use of a load cell, or with strain gauges aligned with the rod axis and either mounted to a soft backing plate bonded to the rod or bonded directly to the rod. Similarly, the polished-rod dynamometer can optionally observe vibrations with internal or external accelerometers, and may optionally include additional sensors for other information relating to pumpjack and oil well operations such as but not limited to temperature, gas detection, gas and/or oil pressure at well, tank oil levels, thief-door opening, or oil flow. Similarly, the same polished-rod dynamometer has wireless digital-radio network connectivity but may or may not have the ability to relay signals from other dynamometers or form a mesh network of dynamometers for relaying signals to a server. Similarly, some embodiments may have batteries and some embodiments may have energy harvesters to charge batteries. Specific embodiments may have any combination of these features. Among specific combinations anticipated by the inventors are:

A polished-rod dynamometer designated A has at least one strain gauge mounted to a soft backing plate, the soft backing plate configured to be mounted to a polished rod of a pumpjack and transmit axial load from the polished rod to the strain gauge; the polished-rod dynamometer also has a processor, a memory containing firmware, and a wireless communicator; the wireless communicator and firmware configured to transmit data derived from the strain gauge, and polished-rod position, to a server.

A polished-rod dynamometer designated AA including the polished-rod dynamometer designated A and further including an accelerometer, the firmware being configured to transmit data derived from the accelerometer to the server.

A polished-rod dynamometer designated AB including the polished-rod dynamometer designated A or AA wherein the accelerometer is located within the polished-rod dynamometer to measure acceleration of the polished rod, and the firmware is configured to determine polished-rod position by identifying a reference tick of each stroke to determine duration of a stroke, and to estimate position over each stroke from readings of the accelerometer on the polished rod by subtracting mean acceleration from the accelerometer measurements over the duration of the stroke, integrating accelerometer readings to estimate velocity, subtracting a mean velocity from the estimated velocity over the stroke duration, integrating to estimate polished-rod position throughout the stroke, and scaling the estimated polished-rod position so a range of estimated position matches the known position range of the polished rod.

A polished-rod dynamometer designated AC including the polished-rod dynamometer designated A, AA or AB wherein the firmware for identifying a reference tick in each stroke uses a magnetic sensor of the polished-rod dynamometer.

A polished-rod dynamometer designated AD including the polished-rod dynamometer designated A, AA or AB wherein identifying a reference tick in each stroke is performed by firmware executing on the processor from readings of the accelerometer by determining a bias b_est by averaging the accelerometer readings over a time period longer than the duration of a polished-rod stroke; subtracting b_est from the accelerometer readings and integrating to determine estimated polished-rod velocity; and searching for maxima or minima in the estimated polished-rod velocity to determine the reference tick for strokes.

A polished-rod dynamometer designated AE including the polished-rod dynamometer designated AC or AD wherein the firmware is configured to receive a standard reference tick by radio from an optical sensor or rotation sensor attached to a shaft coupled to a crank of the pumpjack, and calibrate the reference tick against the standard reference tick.

A polished-rod dynamometer designated AF including the polished-rod dynamometer designated AC or AD, the firmware further comprising firmware configured for: computing reference polished-rod positions from pumpjack characteristics and readings received by radio from an angular position sensor or rotation sensor attached to a shaft coupled to a crank of the pumpjack, and calibrating the estimated polished-rod position against the reference polished-rod positions.

A polished-rod dynamometer designated AG including the polished-rod dynamometer designated A, AA or AB further comprising firmware for receiving the reference tick by short range radio from a sensor pod configured for coupling to the walking beam or crank of the pumpjack.

A polished-rod dynamometer designated AH including the polished-rod dynamometer designated AG wherein the sensor configured for coupling to the walking beam or crank of the pumpjack is selected from the group consisting of an optical sensor, and a 36-1 tooth wheel sensor, and a photodiode and phototransistor.

A polished-rod dynamometer designated AJ including the polished-rod dynamometer designated A, or AA wherein the polished-rod position is determined from sensor readings received by short range radio from a sensor pod configured for coupling to the walking beam or crank of the pumpjack.

A polished-rod dynamometer designated AK including the polished-rod dynamometer designated A, AA or AB wherein the sensor pod configured for coupling to the walking beam or crank of the pumpjack contains a sensor selected from the group consisting of an optical sensor, a 36-1 tooth wheel sensor, and an LED-photodiode or phototransistor pair.

A polished-rod dynamometer designated AL including the polished-rod dynamometer designated A, AA or AB wherein the polished-rod position is determined by a processor of the polished-rod dynamometer from inclinometer readings received by short range radio from a sensor pod configured for coupling to the walking beam of the pumpjack.

A polished-rod dynamometer designated AM including the polished-rod dynamometer designated A, AA, AB, AC, AD, AE, AF, AG, AH, AJ, AK, or AL further comprising a gas detector.

A polished-rod dynamometer designated AN including the polished-rod dynamometer designated AM wherein the firmware includes instructions for compensating inclinometer readings for accelerations of a pumpjack walking beam.

A monitoring device designated B, including: a housing; a circuit board within the housing and configured with: a processor; a memory communicatively coupled with the processor; a communicator configured to communicate through a network to a server; at least one sensor configured to sense movement of the monitoring device; and at least one strain sensor. The monitoring device having firmware in the memory configured to process readings from the at least one sensor configured to sense movement and the at least one strain sensor to determine axial load, and to send reading selected from raw sensor readings or processed sensor readings over the network to the server. The monitoring device is configured for attachment to a part of a pumpjack selected from a polished rod and a walking beam, the sensor configured to sense movement of the monitoring device being a sensor selected from the group consisting of an inclinometer configured to measure walking beam angle and an accelerometer adapted to sense acceleration of a polished rod or walking beam.

A monitoring device designated BA including the monitoring device designated B, where the monitoring device is configured for attachment to a polished rod or a walking beam, the sensor configured to sense movement of the monitoring device being an accelerometer within the monitoring device; where the firmware includes firmware for double integrating the acceleration of the part of the pumpjack selected from the polished rod and the walking beam to determine a position in a cycle of the pumpjack.

A monitoring device designated BB including the monitoring device designated B or BA wherein the server is configured to produce a surface card comprising a plot of position in a cycle of the pumpjack versus axial load as measured by the at least one strain sensor.

A monitoring device designated BC including the monitoring device designated B, BA, and BB further comprising a gyroscopic sensor and accelerometer adapted to determine a rotation of the polished rod.

A polished-rod dynamometer designated C configured for attachment to a polished rod of a pumpjack including at least one accelerometers adapted to measure acceleration and vibration of the polished rod; a strain gauge adapted to measure axial load on the polished rod; a processor adapted by firmware to double-integrate polished-rod acceleration to determine polished-rod position in a pumpjack cycle and to record vibration and tension change on the polished rod relative to polished-rod position.

A polished-rod dynamometer designated CA including the polished-rod dynamometer designated C further includes sensors adapted to monitor rotation of the polished rod.

A polished-rod dynamometer designated CB including the polished-rod dynamometer designated CA where the sensors adapted to determine rotation of the polished rod comprise at least one accelerometer adapted to measure an angular acceleration of the polished rod and at least one gyroscopic sensor.

A polished-rod dynamometer designated D including a housing; at least one axial load sensor within the housing configured to monitor axial load on a polished rod, the axial load sensor selected from a strain gauge and a load cell; a processor within the housing; a memory containing firmware communicatively coupled to the processor, the processor configured to execute machine readable instructions of the firmware; a real-time clock; a wireless communicator, the wireless communicator and firmware configured to transmit at least axial load sensor readings and polished-rod position; and an accelerometer located within housing configured to measure axial acceleration of the polished rod. The polished-rod dynamometer firmware is configured with machine readable instructions to determine polished-rod position by: identifying a reference tick of each polished-rod stroke to determine duration of a stroke; estimating position over each polished-rod stroke from readings from the accelerometer by: computing and subtracting a mean acceleration from the readings from the accelerometer over the duration of the stroke to determine gravity-corrected accelerometer readings, integrating the gravity-corrected accelerometer readings to estimate velocity; computing and subtracting a mean velocity from the estimated velocity over the stroke duration to generate a corrected velocity; integrating the corrected velocity to estimate polished-rod position throughout a polished-rod stroke, and scaling the estimated polished-rod position so a range of estimated polished-rod position matches a known position range of the polished rod.

A polished-rod dynamometer designated DA including the polished-rod dynamometer designated D wherein the firmware for identifying a reference tick in each stroke uses readings of a magnetic sensor of the polished-rod dynamometer.

A polished-rod dynamometer designated DB including the polished-rod dynamometer designated DA wherein the firmware for identifying a reference tick in each stroke is performed by processing the readings from the accelerometer by: determining a bias b_est by averaging the readings from the accelerometer over a time period longer than the duration of a polished-rod stroke; subtracting the bias b_est from the readings from the accelerometer and integrating to determine estimated polished-rod velocity; and searching for maxima or minima in the estimated polished-rod velocity to determine the reference tick.

A polished-rod dynamometer designated DC including the polished-rod dynamometer designated DB wherein the firmware is configured with machine readable instructions to: receive a standard reference tick by wireless connection from a sensor pod comprising an optical sensor or rotation sensor attached to a shaft coupled to a crank of the pumpjack, and calibrate the reference tick against the standard reference tick.

A polished-rod dynamometer designated DD including the polished-rod dynamometer designated DC wherein the firmware is configured to calibrate the reference tick against the standard reference tick for each speed of pumpjack operation.

A polished-rod dynamometer designated DE including the polished-rod dynamometer designated D, the firmware further configured with machine readable instructions for: computing reference polished-rod positions from pumpjack characteristics and readings received by wireless from an angular position sensor or rotation sensor attached to a shaft coupled to a crank of the pumpjack, and calibrating the estimated polished-rod position against the reference polished-rod positions.

A polished-rod dynamometer designated DF including the polished-rod dynamometer designated D, the firmware further comprising machine readable instructions for receiving the reference tick by short range radio from a sensor pod configured for coupling to the walking beam or crank of the pumpjack.

A polished-rod dynamometer designated DG including the polished-rod dynamometer designated D wherein the sensor configured for coupling to the walking beam or crank of the pumpjack is selected from the group consisting of an optical sensor, a 36-1 tooth wheel sensor, and an optical sensor.

A polished-rod dynamometer designated E includes: at least one axial load sensor configured to monitor axial load on a polished rod, the axial load sensor selected from a strain gauge and a load cell; a processor; a memory containing firmware communicatively coupled to the processor, the processor configured to execute machine readable instructions of the firmware; a wireless communicator, the wireless communicator and firmware configured to transmit at least axial load sensor readings and polished-rod position; and an accelerometer configured to measure axial acceleration of the polished rod; wherein the firmware is configured with machine readable instructions to determine polished-rod position by: correlating a sequence of observed accelerometer readings to a sequence of predicted accelerometer readings, the sequence of predicted accelerometer readings derived from a model of mechanical components of a pumpjack to determine timing and duration of a polished-rod stroke.

A polished-rod dynamometer designated DH including the polished-rod dynamometer designated D, DA, DB, DC, DD, DE, DF, DG, and DH further comprising a magnetometer configured to sense rotation of the polished rod.

A polished-rod dynamometer designated DJ including the polished-rod dynamometer designated DH further comprising an accelerometer and a gyroscopic sensor configured to sense rotation of the polished rod.

A method of monitoring a polished rod of a pumpjack designated F includes: providing at least one axial load sensor configured to monitor axial load on a polished rod, the axial load sensor selected from a strain gauge and a load cell; reading an accelerometer configured to measure axial acceleration of the polished rod; identifying a reference tick of each polished-rod stroke to determine duration of a polished-rod stroke; estimating position over each polished-rod stroke from readings from the accelerometer by: computing and subtracting a mean acceleration from the readings from the accelerometer over the duration of the stroke to determine gravity-corrected accelerometer readings, integrating the gravity-corrected accelerometer readings to estimate velocity; computing and subtracting a mean velocity from the estimated velocity over the stroke duration to generate a corrected velocity; integrating the corrected velocity to estimate polished-rod position throughout a polished-rod stroke, and scaling the estimated polished-rod position so a range of estimated polished-rod position matches a known position range of the polished rod.

A method designated FA including the method designated F wherein the firmware for identifying a reference tick in each stroke uses readings of a magnetic sensor of the polished-rod dynamometer.

A method designated FB including the method designated FA wherein the firmware for identifying a reference tick in each stroke is performed by processing the readings from the accelerometer by: determining a bias b_est by averaging the readings from the accelerometer over a time period longer than the duration of a polished-rod stroke; subtracting the bias b_est from the readings from the accelerometer and integrating to determine estimated polished-rod velocity; and searching for maxima or minima in the estimated polished-rod velocity to determine the reference tick.

A method designated FC including the method designated FB further including receiving a standard reference tick by wireless from an optical sensor or rotation sensor attached to a shaft coupled to a crank of the pumpjack, and calibrating the reference tick against the standard reference tick.

A method designated FD including the method designated FC further comprising calibrating the reference tick against the standard reference tick for each speed of pumpjack operation.

A method designated FE including the method designated F, FA, FB, or FC further comprising computing reference polished-rod positions from pumpjack characteristics and readings received by wireless from an angular position sensor or rotation sensor attached to a shaft coupled to a crank of the pumpjack, and calibrating the estimated polished-rod position against the reference polished-rod positions.

A method designated FF including the method designated F, further comprising receiving the reference tick by wireless from a sensor pod configured for coupling to the walking beam or crank of the pumpjack.

A method designated FG including the method designated FF wherein the sensor configured for coupling to the walking beam or crank of the pumpjack is selected from the group consisting of an optical sensor, a 36-1 tooth wheel sensor, and an optical sensor.

A method designated G of determining axial load and position of a polished rod of a pumpjack includes: sensing axial load on the polished rod with an axial load sensor, the axial load sensor selected from a strain gauge and a load cell; executing firmware on a processor, the firmware performing wirelessly transmitting at least axial load sensor readings and polished-rod position; and sensing axial acceleration of the polished rod with an accelerometer; correlating a sequence of observed accelerometer readings to a sequence of predicted accelerometer readings, the sequence of predicted accelerometer readings derived from a model of mechanical components of a pumpjack to determine timing and duration of a polished-rod stroke.

A method designated FL including the method designated F, FA, FB, FC, FD, FE, FF, or FG and further including calibrating the estimated polished-rod position using a reference polished-rod position provided by a wireless inclinometer attached to the walking beam. The wireless inclinometer includes either a pair of physically separated accelerometers or a collocated accelerometer and rate-gyroscopic sensor, and a processor having memory with firmware configured to read the sensors, and compute therefrom an incline angle of the walking beam corrected for acceleration; and a wireless communicator configured to transmit the incline angle of the walking beam with an angle-capture time from a real-time clock.

A method designated FH including the method designated F, FA, FB, FC, FD, FE, FF, FG, FL, or G further includes sensing a magnetic field with a magnetometer configured to sense rotation of the polished rod.

A method designated FJ including the method designated FH further includes sensing rotation of the polished rod with an accelerometer and a gyroscopic sensor in addition to sensing a magnetic field with a magnetometer.

A wireless inclinometer designated K adapted for mounting on a walking beam of a pumpjack at a known location relative to a saddle bearing of the pumpjack, the inclinometer comprising sensors selected from the group consisting of a first and second physically separated accelerometer and a collocated first accelerometer and rate-gyroscopic sensor; a processor having associated memory with firmware residing in the memory, the firmware comprising firmware configured to read first accelerometer and second accelerometer or rate gyroscopic sensor and compute therefrom an angle of the walking beam corrected for acceleration; and a wireless communicator configured to transmit the angle of the walking beam to a polished-rod dynamometer.

A wireless polished-rod rotation monitor designated H and including at least one polished-rod rotation sensor including a magnetometer, an accelerometer, or a gyroscopic sensor; a processor; a real-time clock; a wireless communicator; and a memory containing firmware with machine readable instructions executable by the processor to obtain rod rotation data by reading the polished-rod rotation sensor and to transmit the rod rotation data over the wireless communicator.

A wireless polished-rod rotation monitor designated HA including the wireless polished-rod rotation monitor designated H where the at least one polished-rod rotation sensor includes all of a magnetometer, an accelerometer, and a gyroscopic sensor; the magnetometer configured to sense low speed rotation of the polished rod and the accelerometer and gyroscopic sensor configured to sense high speed rotation of the polished rod.

A method of monitoring a polished rod of a pumpjack designated J includes providing an axial load sensor configured to monitor axial load on a polished rod, the axial load sensor selected from a strain gauge and a load cell; reading an accelerometer configured to measure axial acceleration of the polished rod to provide accelerometer data; estimating operating speed of the pumpjack though periodicity of the accelerometer data; and accessing a catalog having relationships between the accelerometer data, the estimated operating speed of the pumpjack, and polished-rod position to determine polished-rod position.

A method designated JA including the method designated J where the catalog having relationships between the accelerometer data, the estimated operating speed of the pumpjack, and polished-rod position is previously generated by operating the same or similar pumpjack with a trusted polished-rod position sensor selected from the group consisting of an angle encoder coupled to a rotating or rocking component of the pumpjack; an ultrasonic, laser, or other rangefinder adapted to measure distance between a location on the polished rod and the stuffing box, a stationary reflector, or other stationary wellhead components.

CONCLUSION

Changes may be made in the above methods and systems without departing from the scope hereof. The matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A polished-rod dynamometer comprising:
    at least one axial load sensor that monitors axial load on a polished rod, the axial load sensor being selected from a strain gauge and a load cell;
    a processor;
    a memory communicatively coupled to the processor and storing firmware;
    a real-time clock;
    a wireless communicator that transmits at least axial load sensor readings and polished-rod position; and
    an accelerometer that measures axial acceleration readings of the polished rod;
    wherein the firmware comprises machine-readable instructions that, when executed by the processor, control the polished-rod dynamometer to:
    identify, for each polished-rod stroke of a plurality of polished-rod strokes, a reference tick of said each polished-rod stroke to determine a duration of said each polished-rod stroke; and
    estimate polished-rod position throughout each polished-rod stroke from readings from the accelerometer by:
        computing a mean acceleration of the axial acceleration readings over the duration of said each polished-rod stroke;
        subtracting the mean acceleration from the axial acceleration readings to obtain gravity-corrected accelerometer readings;
        integrating the gravity-corrected accelerometer readings to estimate velocity throughout each polished-rod stroke;
        computing and subtracting a mean velocity from the estimated velocity throughout the duration of said each polished-rod stroke to generate a corrected velocity;
        integrating the corrected velocity to estimate the polished-rod position throughout said each polished-rod stroke; and
        scaling the estimated polished-rod position so that a range of estimated polished-rod positions matches a known position range of the polished rod.

2. The polished-rod dynamometer of claim 1, wherein the firmware identifying a reference tick of each polished-rod stroke uses readings of a magnetic sensor of the polished-rod dynamometer.

3. The polished-rod dynamometer of claim 1, wherein the firmware identifying a reference tick of each polished-rod stroke is performed by processing the readings from the accelerometer by:
    estimating a bias by averaging the readings from the accelerometer over a time period longer than the duration of said each polished-rod stroke;
    subtracting the estimated bias from the readings from the accelerometer and integrating to determine estimated polished-rod velocity; and
    searching for maxima or minima in the estimated polished-rod velocity to determine the reference tick.

4. The polished-rod dynamometer of claim 3, wherein the firmware further includes machine-readable instructions that, when executed by the processor, control the polished-rod dynamometer to:
    receive a standard reference tick wirelessly from a sensor pod comprising an inclinometer, optical sensor, or rotation sensor coupled to a crank of a pumpjack, and
    calibrate the reference tick against the standard reference tick.

5. The polished-rod dynamometer of claim 4, wherein the firmware calibrates the reference tick against the standard reference tick for each speed of pumpjack operation.

6. The polished-rod dynamometer of claim 1, wherein the firmware includes further machine-readable instructions that, when executed by the processor, control the polished-rod dynamometer to:
    compute reference polished-rod positions from pumpjack characteristics and readings received wirelessly from an angular position sensor or rotation sensor coupled to a crank of the pumpjack, and
calibrate the range of estimated polished-rod positions against the reference polished-rod positions.

7. The polished-rod dynamometer of claim 1, the firmware further comprising machine-readable instructions that, when executed by the processor, control the polished-rod dynamometer to receive the reference tick wirelessly from a sensor pod that couples to a walking beam or crank of the pumpjack.

8. The polished-rod dynamometer of claim 7, wherein the sensor pod is selected from the group consisting of a missing-tooth wheel sensor, a potentiometer, and an optical sensor.

9. A method of monitoring a polished rod of a pumpjack, comprising:
providing at least one axial load sensor that monitors axial load on a polished rod, the axial load sensor being selected from a strain gauge and a load cell;
reading an accelerometer that measures axial acceleration of the polished rod;
identifying, for each polished-rod stroke of a plurality of polished-rod strokes, a reference tick of each polished-rod stroke to determine a duration of said each polished-rod stroke;
estimating polished-rod position throughout each polished-rod stroke from readings from the accelerometer by:
computing a mean acceleration of the axial acceleration readings over the duration of said each polished-rod stroke;
subtracting the mean acceleration from the axial acceleration readings to obtain gravity-corrected accelerometer readings,
integrating the gravity-corrected accelerometer readings to estimate velocity throughout each polished-rod stroke;
computing and subtracting a mean velocity from the estimated velocity throughout the duration of said each polished-rod stroke to generate a corrected velocity;
integrating the corrected velocity to estimate polished-rod position throughout a polished-rod stroke, and
scaling the estimated polished-rod position so that a range of estimated polished-rod position matches a known position range of the polished rod.

10. The method of claim 9, wherein said identifying a reference tick of each polished-rod stroke uses readings of a magnetic sensor.

11. The method of claim 9, wherein said identifying a reference tick of each polished-rod stroke is performed by processing the readings from the accelerometer by:
estimating a bias by averaging the readings from the accelerometer over a time period longer than the duration of a polished-rod stroke;
subtracting the estimated bias from the readings from the accelerometer and integrating to determine estimated polished-rod velocity; and
searching for maxima or minima in the estimated polished-rod velocity to determine the reference tick.

12. The method of claim 11, further comprising receiving a standard reference tick wirelessly from an optical sensor or rotation sensor coupled to a crank of the pumpjack, and calibrating the reference tick against the standard reference tick.

13. The method of claim 12, further comprising calibrating the reference tick against the standard reference tick for each speed of pumpjack operation.

14. The method of claim 9, further comprising computing reference polished-rod positions from pumpjack characteristics and readings received wirelessly from an angular position sensor or rotation sensor coupled to a crank of the pumpjack, and calibrating the range of estimated polished-rod positions against the reference polished-rod positions.

15. The method of claim 9, further comprising receiving the reference tick wirelessly from a sensor pod coupled to a walking beam or crank of the pumpjack.

16. The method of claim 15, wherein the sensor pod is selected from the group consisting of an inclinometer, a missing-tooth wheel sensor, and an optical sensor.

17. A wireless inclinometer in a first housing adapted for mounting on a walking beam of a pumpjack at a known location relative to a saddle bearing of the pumpjack, the inclinometer comprising:
sensors selected from the group consisting of: first and second physically separated accelerometers, and a collocated accelerometer and rate-gyroscopic sensor;
a processor having associated memory with firmware residing in the memory, the firmware being configured to read the sensors and compute therefrom an angle of the walking beam corrected for acceleration;
a first real-time clock; and
a wireless communicator configured to transmit the angle of the walking beam with an angle-capture time from the first real-time clock to a polished-rod dynamometer.

* * * * *